United States Patent
Elkatatny

(10) Patent No.: US 11,414,585 B2
(45) Date of Patent: Aug. 16, 2022

(54) WEIGHTED DRILLING FLUID CONTAINING ORGANOPHILIC PHYLLOSILICATE

(71) Applicant: King Fahd University of Petroleum and Minerals, Dhahran (SA)

(72) Inventor: Salaheldin Elkatatny, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/545,620

(22) Filed: Aug. 20, 2019

(65) Prior Publication Data

US 2021/0054255 A1  Feb. 25, 2021

(51) Int. Cl.
 *C09K 8/36* (2006.01)
(52) U.S. Cl.
 CPC ..................... *C09K 8/36* (2013.01)
(58) Field of Classification Search
 CPC ........................................................ C09K 8/36
 See application file for complete search history.

(56) References Cited

U.S. PATENT DOCUMENTS

| 8,389,447 B2 | 3/2013 | Dino et al. |
| 10,119,061 B2 | 11/2018 | Dino et al. |
| 10,208,540 B2 | 2/2019 | Van Slyke et al. |
| 2014/0148369 A1 | 5/2014 | Tang et al. |
| 2016/0264838 A1* | 9/2016 | Nelson ............... C04B 28/02 |
| 2017/0051193 A1* | 2/2017 | Dino .................... C09K 8/32 |
| 2018/0155604 A1 | 6/2018 | Smith et al. |

FOREIGN PATENT DOCUMENTS

WO    2017/189738 A1    11/2017

OTHER PUBLICATIONS

Falana, et al. ; Novel Sag Reducing Additive for Non-aqueous Drilling Fluids ; American Association of Drilling Engineers ; 2007 ; 7 Pages.

Fakoya, et al. ; Journal of Petroleum Science and Engineering. vol. 165 ; pp. 777-785 ; Jun. 2018 ; Abstract Only ; 2 Pages.

* cited by examiner

*Primary Examiner* — Frances Tischler
(74) *Attorney, Agent, or Firm* — Oblon, McClelland, Maier & Neustadt, L.L.P.

(57) ABSTRACT

A drilling fluid formulation is provided, which includes a fluid phase, an organophilic phyllosilicate as an anti-sagging additive, and a weighting agent (e.g. barite). The organophilic phyllosilicate contains an ion-exchange reaction product of a clay material (e.g. smectite) and quaternary ammonium cations. The organophilic phyllosilicate is effective in preventing barite sagging as demonstrated by low sag factor when drilling at elevated temperatures. Rheology properties of the drilling fluid including gel strength, yield point, plastic viscosity, and storage modulus are also specified.

18 Claims, 6 Drawing Sheets

WEIGHTED DRILLING FLUID CONTAINING ORGANOPHILIC PHYLLOSILICATE

BACKGROUND OF THE INVENTION

Technical Field

The present disclosure relates to a drilling fluid with low sag tendency. The drilling fluid contains a weighting agent, and an organophilic phyllosilicate which is an ion-exchange reaction product of a smectite clay and quaternary ammonium cations.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids contain a mixture of suspended solids and dissolved liquids. Solids are present as a discontinuous phase dispersed in the liquid (i.e. continuous) phase. Invert emulsion drilling fluid (IEDF) is a drilling fluid in which the continuous phase is oil and the internal or dispersed phase is water. Drilling fluids are introduced during drilling operations to fulfill many functions, including: (i) lubricating and cooling of the drill bit and drill string [Gordon, C., Lewis, S., Tonmukayakul, P., 2008. Rheological properties of cement spacer: mixture effects. In: AADE Fluids Conference and Exhibition Held in Houston, Tex., AADE-08-DF-HO-09, 8-9 April], (ii) transporting drilled cuttings to the surface during drilling and suspending it in the drilling fluid once drilling operation stops [Fink, J. K., 2012. Petroleum engineer's guide to oil field chemicals and fluids. Waltham, Mass.: Gulf Professional Pub], (iii) preventing formation fluids from invading the wellbore hole, and (iv) maintaining the wellbore stability by creating a low permeability film on the borehole's wall (i.e. filter cake) [Bourgoyne, Jr. A. T., Chenevert, M. E., Millheim, Keith, K., Young, Jr. F. S., 1986. Applied Drilling Engineering; Rabia, H., 2001. Well Engineering and Construction. Entrac Consulting; and Hossain, M., Al-Majed, A. A., 2015. Fundamentals of Sustainable Drilling Engineering. John Wiley & Sons].

Another function of drilling fluid is to control the formation pressure by applying a sufficient hydrostatic pressure on the formation [Stroud, B. K., 1922. Mud-laden Fluids and Tables on Specific Gravities and Collapsing Pressures, Louisiana Department of Conservation]. Various weighting materials such as barite, ilmenite, and manganese tetra oxide can be used to generate the hydrostatic pressure of drilling fluid [Rugang, Y., Guancheng, J., Wei, L., Tianqing, D., Hongxia, Z., 2014. Effect of water-based drilling fluid components on filter cake structure. Powder Technoogy 262, 51-61; Elkatatny, S. M., Nasr-El-Din, H., and Al-Bagoury, M. 2013. Evaluation of Micronized Ilmenite as Weighting Material in Water-Based Drilling Fluids for HPHT Applications. Paper SPE 163377 presented at the SPE Kuwait International Petroleum Conference and Exhibition held in Kuwait City, Kuwait, December 10-12; Elkatatny, S. M., A. Al Moajil, and Nasr-El-Din, H. A. 2012. Evaluation of a New Environmentally Friendly Treatment to Remove $Mn_3O_4$ Filter Cake. Paper SPE 156451 presented at the IADC/SPE Asia Pacific Drilling Technology Conference (APDT), Tianjin, China, July 9-11; Al-Yami, A. S., Nasr-El-Din, H. A., Al-Majed, A. A., Menouar, H., 2007. An Innovative Manganese Tetra-Oxide/KCl Water-Based Drill-in Fluids for HT/HP Wells. Paper SPE-110638 presented at the SPE Annual Technical Conference and Exhibition. California, November 11-14; and Tehrani, A., Cliffe, A., Hodder, M. H., Young, S., Lee, J., Stark, J., Seale, S., 2014. Alternative Drilling Fluid Weighting Agents: A Comprehensive Study on Ilmenite and Hematite. Paper IADC/SPE-167937 presented at the IADC/SPE Drilling Conference and Exhibition. Texas. March 4-6]. However, the heavy weighting agents often cause damage to the formation leading to a reduction in well production. Particle sagging is a common issue encountered particularly when drilling high-pressure high-temperature formations.

Barite is one of the most common weighting materials used in drilling and completion fluids. Barite weighting agents have many advantages including their low cost, high density, minimal environmental impact, and high purity [Nguyen, T., Miska, S., Yu, M., Takach, N., 2009. Predicting Dynamic Barite Sag in Newtonian-Oil Based Drilling Fluids in Pipe. Paper SPE-124137 presented at the SPE Annual Technical Conference and Exhibition. New Orleans, October 4-7; and Ba geri, B. S., Mahmoud, M., Abdulraheem, A., Al-Mutairi, S. H., Elkatatny, S. M., and Shawabkeh, R. A., 2017. Single stage filter cake removal of barite weighted water based drilling fluid. Journal of Petroleum Science and Engineering, 149(2017), 476-484]. Nevertheless, barite sagging is a challenging phenomenon that occurs while drilling with fluids weighted with barite [Bern, P. A., Oort, E. Van, Neustadt, B., Ebeltoft, H., Zurdo, C., Zamora, M. and Slater, K. S. 2000. Barite Sag: Measurement, Modeling, and Management, 15(1); pp. 25-30; and Omland, T. H., Saasen, A., Zwaag, C., Amundsen, P. A., 2007. The Effect of Weighting Material Sag on Drilling Operation Efficiency. Paper SPE 110537 presented at the SPE Asia Pacific Oil & Gas Conference and Exhibition. Jakarta, 30 October-1 November]. Another problem often encountered with barite weighted drilling involves formation damage near the wellbore [Al-Yami, A. S., Nasr-El-Din, H. A., Al-Shafei, M. A., and Bataweel, M. A., 2013. Impact of Water-Based Drilling-In Fluids on Solids Invasion and Damage Characteristics. SPE Production & Operations, 25(01), 40-49]. Barite sagging occurs when barite particles separate from the liquid phase and settle causing variations in fluid density that may result in loss of well control [Saasen, A., Jordal, 0. H., Burkhead, D., Berg, P. C., Loklingholm, G., Pedersen, E. S., Turner, J., Harris, M. J., 2002. Drilling HT/HP Wells Using a Cesium Formate Based Drilling Fluid. Paper IADC/SPE 74541 presented at the IADC/SPE Drilling Conference. Dallas. February 26-28; and Zamora, M. and Bell, R. 2004. Improved Wellsite Test for Monitoring Barite Sag. Paper AADE-04DF-HO-19 presented at the AADE 2004 Drilling Fluids Conference, Houston, Tex., April 6-7].

Hanson et al. [Hanson, P. M., Trigg, T. K., Rachal, G., and Zamora, M., 1990. Investigation of Barite "Sag" in Weighted Drilling Fluids in Highly Deviated Wells. Paper SPE 20423 presented at the 65th Annual Technical Conference and Exhibition. New Orleans. September 23-26] indicated that barite sagging might become a serious issue in drilling and completing oil and gas wells, especially in low-shear cases. Optimization and monitoring for drilling fluid rheological properties, and training for drilling personnel would help manage solids sagging and mitigate its consequences [Scott, P. D., Zamora, M., Aldea, C., 2004. Barite-Sag Management: Challenges, Strategies, Opportunities. Paper IADC/SPE 87136 presented at the IADC/SPE Drilling Conference. Dallas. March 2-4].

Barite sagging under static conditions occurs when a sag factor, which is the ratio of the fluid density at bottom to the sum of the density at the top and bottom, becomes greater than 0.53, while a sag factor between 0.5 to 0.53 represents a good sag performance [Maxey, J. 2007. Rheological Analysis of Static and Dynamic Sag in Drilling Fluids. Annual Transactions of the Nordic Rheology Society, 15: pp. 181-188, incorporated herein by reference in its entirety]. Fluid rheology and annular velocity are main factors affecting the sagging under static and dynamic conditions. Shear stress values at low shear rate can be applied to evaluate dynamic sagging even in the absence of static sag [Dye, W., Hemphill, T., Gusler, W. and Mullen, G. 2001, Correlation of Ultralow-Shear-Rate Viscosity and Dynamic Barite Sag. Paper SPE Drilling & Completion, 16(1): 27-34; and Dye, W., Mullen, G. and Gusler, W. 2006. Field-Proven Technology to Manage Dynamic Barite Sag. IADC/SPE 98167 presented at the IADC/SPE Drilling Conference, SPE, Florida, U.S.A. February 21-23, each incorporated herein by reference in their entirety].

If the annular velocity is greater than 100 ft/min, the drilling fluid may have a low tendency for dynamic barite sagging. An annular velocity around 30 ft/min indicates that there is a high probability of barite sagging [Dye, W., Hemphill, T., Gusler, W. and Mullen, G. 2001, Correlation of Ultralow-Shear-Rate Viscosity and Dynamic Barite Sag. Paper SPE Drilling & Completion, 16(1): 27-34; Dye, W., Mullen, G. and Gusler, W. 2006. Field-Proven Technology to Manage Dynamic Barite Sag. IADC/SPE 98167 presented at the IADC/SPE Drilling Conference, SPE, Florida, U.S.A. February 21-23; and Bern, P. A., Oort, E. Van, Neustadt, B., Ebeltoft, H., Zurdo, C., Zamora, M. and Slater, K. S. 2000. Barite Sag: Measurement, Modeling, and Management, 15(1); pp. 25-30, each incorporated herein by reference in their entirety].

Gel strength also plays a vital role in preventing the sagging. Drilling fluids with weak gel strength have a high possibility of particle sagging [Saasen, A., Liu, D., Marken, C. D. and Halsey, G. W. 1995. Prediction of Barite Sag Potential of Drilling Fluids from Rheological Measurements. SPE/IADC 29410 paper presented at SPE/IADC Conference, Amsterdam, Netherlands, 28 February-2 March; and Bui, B., Saasen, A., Maxey, J., Ozbayoglu, M. E., Miska, S. Z., Yu, M. and Takach, N. E. 2012. Viscoelastic Properties of Oil-Based Drilling fluids. Annual Transactions of the Nordic Rheology Society, 20: pp. 33-47, each incorporated herein by reference in their entirety]. Drilling fluid performance is further affected by the yield stress characteristics of the fluids. Yield stress of a drilling fluid may impact its properties such as barite sag, hole cleaning, surge and swab pressures, and equivalent circulating density [Power, D., Zamora, M., 2003. Drilling Fluid Yield Stress: Measurement Techniques for Improved Understanding of Critical Drilling Fluid Parameters. Paper AADE-03-NTCE-35 presented at the AADE National Technology Conference. Houston. April 1-3, incorporated herein by reference in its entirety]. Drilling fluid with a yield stress of 12 lb/100 ft$^2$ or more has a low tendency for barite sagging [Nguyen, T., Miska, S., Yu, M., Takach, N., Ahmed, R., Saasen, A., Henry, T. and Maxey, J. 2011. Engineering Experimental study of dynamic barite sag in oil-based drilling fluids using a modified rotational viscometer and a flow loop. Journal of Petroleum Science and Engineering, 78(1): pp. 160-5; and Nguyen, T. C., Miska, S., Saasen, A. and Maxey, J. 2014. Using Taguchi and ANOVA methods to study the combined effects of drilling parameters on dynamic barite sag. Journal of Petroleum Science and Engineering, 121(September): pp. 126-33, each incorporated herein by reference in their entirety].

Different approaches have been investigated to prevent or alleviate barite sagging. Mohamed et al. [Mohamed, A. K., Elkatatny, S. A., Mahmoud, M. A., Shawabkeh, R. A. and Al-Majed, A. A. 2017. The Evaluation of Micronized Barite as a Weighting Material for Completing HPHT Wells. Paper SPE-183768-MS presented at the SPE Middle East Oil & Gas Show and Conference. Manama, Kingdom of Bahrain, March 6-9, incorporated herein by reference in its entirety] evaluated the effect of reducing the size of barite particles on sagging, and suggested that using micro-sized barite reduced the sag factor but did not prevent barite sagging (i.e. the sag factor remained greater than 0.53). Using nanoparticles and rheology modifier helped prevent the barite sagging over a wide range of densities (9 to 16 ppg) of invert emulsion drilling fluid [Wagle, V., Al-Yami, A. S. and Alabdullatif, Z. 2015. Using Nanoparticles to Formulate Sag-Resistant Invert Emulsion Drilling. Paper SPE/IADC-173004-MS presented at the SPE/IADC Drilling Conference and Exhibition, London, England, UK, March 17-19; and Wagle, V., Maghrabi, S. and Kulkarni, D. 2013. Formulating Sag-Resistant, Low-Gravity Solids-Free Invert Emulsion fluids. Paper SPE 164200 presented at the SPE Middle East Oil and Gas Show and Conference, Manama, Bahrain, March 10-13, each incorporated herein by reference in their entirety].

Davis et al. indicated that a sag stability enhancer, with a molecular weight of greater than or equal to about 200 g/mol, could be used to mitigate barite sagging for invert emulsion drilling fluid [Davis, L., Lfvanec, W., and Shumway, W., Additive to enhance sag stability of drilling fluid, International publication number WO 2017/188946 A1, incorporated herein by reference in its entirety]. Basfar et al. [Basfar, S., Elkatatny, S., Mahmoud, M., Kamal, M. S., Murtaza, M., and Stanitzek, T., 2018. Prevention of Barite Sagging while Drilling High-Pressure High-Temperature (HPHT) Wells. Paper SPE-192198-MS presented at the SPE Kingdom of Saudi Arabia Annual Technical Symposium and Exhibition. Dammam. April 23-26, incorporated herein by reference in its entirety] and Elkatatny [Elkatatny, S. M. 2018. Enhancing the Stability of Invert Emulsion Drilling Fluid for Drilling in High-Pressure High-Temperature Conditions. Energies, 11(9), 2393, incorporated herein by reference in its entirety] studied the effect of styrene and acrylic based copolymers on sag tendency of invert emulsion drilling fluids at different temperatures. It was found that addition of only 1 lb$_m$/bbl of the copolymer prevented barite sag at both vertical and inclined conditions at a temperature of up to 350° F.

Despite these recent advances, there is still need to develop new additives to enhance fluid stability and prevent sagging in drilling fluids. In view of the forgoing, one objective of the present disclosure is to provide a drilling fluid formulation containing an anti-sagging additive (i.e. an organophilic phyllosilicate). The drilling fluid demonstrates improved rheology properties and drilling capability at elevated temperatures.

BRIEF SUMMARY OF THE INVENTION

According to a first aspect, the present disclosure relates to a drilling fluid including an oil phase, an organophilic phyllosilicate, and a weighting agent, wherein the organophilic phyllosilicate comprises an ion-exchange reaction product of a smectite-type clay and a compound of formula (I)

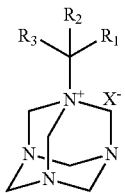

(I)

or a salt thereof, a solvate thereof, a tautomer thereof, a stereoisomer thereof, or a mixture thereof wherein (i) $R_1$ is selected from the group consisting of a hydrogen, an optionally substituted $C_{1-6}$ alkyl, an optionally substituted alkenyl, and an optionally substituted aryl, (ii) $R_2$ and $R_3$ are independently a hydrogen, or an optional substituted $C_{1-6}$ alkyl, and (iii) X is an anion selected from the group consisting of a hexafluorophosphate ion, a trifluoromethanesulfonate ion, a tetrafluoroborate ion, and a halide ion.

In one embodiment, the drilling fluid further comprises an aqueous phase dispersed in the oil phase.

In one embodiment, $R_1$ is a $C_{2-4}$ alkenyl substituted with one or more halides.

In one embodiment, $R_1$ is ClCH=CH—*.

In one embodiment, $R_2$ and $R_3$ are a hydrogen.

In one embodiment, the anion is a chloride.

In one embodiment, the compound of formula (I) is

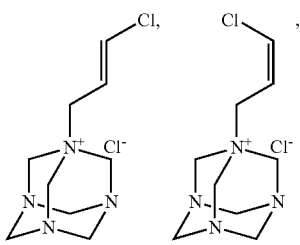 [SMILES: Cl/C=C/C[N+]12CN3CN(CN(C3)C1)C2 ; [Cl-] ; Cl/C=C\C[N+]12CN3CN(CN(C3)C1)C2 ; [Cl-]]

or both.

In one embodiment, at least 50 mol % of exchangeable cations of the smectite-type clay are ion exchanged with quaternary ammonium cations from the compound of formula (I).

In one embodiment, the smectite-type clay contains bentonite.

In one embodiment, the organophilic phyllosilicate has a bulk density of 75-250 kg/m³, and a specific weight of 1.1-2.5 g/cm³.

In one embodiment, the weighting agent is barite.

In one embodiment, the organophilic phyllosilicate is present in an amount of 500-40,000 mg/L relative to a total volume of the drilling fluid, and a weight ratio of the weighting agent to the organophilic phyllosilicate ranges from 50:1 to 300:1.

In one embodiment, the drilling fluid further comprises at least one additive selected from the group consisting of an emulsifier, a viscosifier, a fluid-loss control agent, and a bridging agent.

In one embodiment, the drilling fluid has a density in a range of 14-20 ppg.

In one embodiment, the drilling fluid has a sag factor in a range of 0.500-0.510 at a vertical condition, at a temperature of 180-500° F. and a pressure of 300-800 psi.

In one embodiment, the drilling fluid has a sag factor in a range of 0.500-0.510 at an inclined condition of 30-60°, at a temperature of 180-500° F. and a pressure of 300-800 psi.

In one embodiment, the drilling fluid has a ten-second gel strength of 24-30 lb/100 ft², a ten-minute gel strength of 27-35 lb/100 ft², and a thirty-minute gel strength of 34-40 lb/100 ft², at a temperature of 180-500° F.

In one embodiment, the drilling fluid has a plastic viscosity of 20.5-25 cP at a temperature of 180-500° F.

In one embodiment, the drilling fluid has a yield point of 35-40 lb/100 ft² at a temperature of 180-500° F.

According to a second aspect, the present disclosure relates to a method of drilling a subterranean geological formation. The method involves drilling the subterranean geological formation to form a wellbore therein, and circulating the drilling fluid of the first aspect into the wellbore during the drilling. The organophilic phyllosilicate prevents sagging of the weighting agent in the wellbore.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
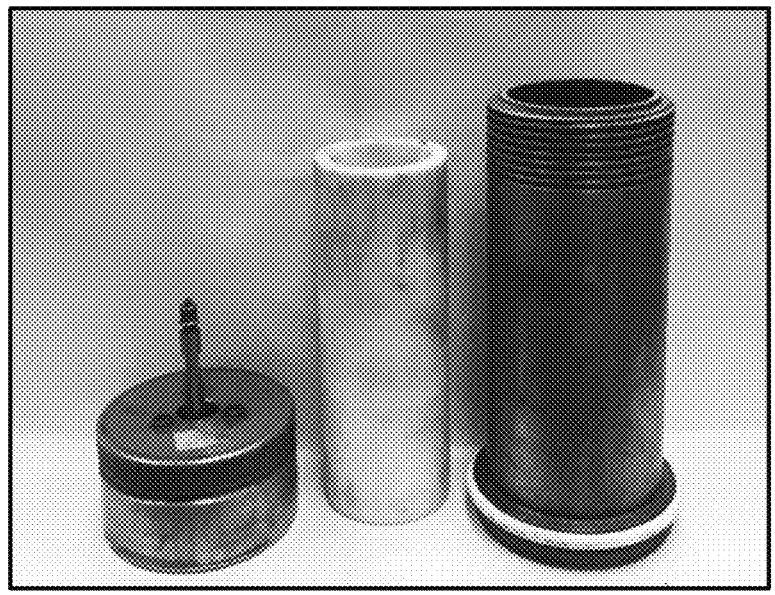
FIG. 1A shows the disassembled cell for the sag test.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values).

As used herein, the terms "compound" and "product" are used interchangeably, and are intended to refer to a chemical entity, whether in the solid, liquid or gaseous phase, and whether in a crude mixture or purified and isolated.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those of ordinary skill in the art.

As used herein, the term "tautomer" refers to constitutional isomers of organic compounds that readily convert by tautomerization or tautomerism. The interconversion commonly results in the formal migration of a hydrogen atom or proton, accompanied by a switch of a single bond and adjacent double bond. Tautomerism is a special case of structural isomerism, and because of the rapid interconversion, tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic tautomerism in heterocyclic rings), and open-chain and cyclic forms of an acetal or hemiacetal (e.g., in reducing sugars).

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans- (or E- and Z-) stereoisomers of the compounds of the present disclosure wherein rotation around the double bond is restricted, keeping the substituents fixed relative to each other, are described and may be isolated as a mixture of isomers or as separated isomeric forms. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanoylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, unsubstituted amide (i.e. —CONH$_2$), substituted amide (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "alkenyl" refers to a straight, branched, or cyclic hydrocarbon fragment containing at least one C=C double bond. Exemplary alkenyl groups include, without limitation, 1-propenyl, 2-propenyl (or "allyl"), 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl, 6-octenyl, 7-octenyl, 1-nonenyl, 2-nonenyl, 3-nonenyl, 4-nonenyl, 5-nonenyl, 6-nonenyl, 7-nonenyl, 8-nonenyl, 1-decenyl, 2-decenyl, 3-decenyl, 4-decenyl, 5-decenyl, 6-decenyl, 7-decenyl, 8-decenyl, and 9-decenyl.

The term "aryl", as used herein, and unless otherwise specified, refers to phenyl, biphenyl, naphthyl, anthracenyl, and the like.

The term "halogen", as used herein, means fluoro, chloro, bromo, and iodo.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}$C and $^{14}$C, isotopes of nitrogen include $^{14}$N and $^{15}$N, and isotopes of oxygen include $^{16}$O, $^{17}$O and $^{18}$O. Isotopically labeled compounds of the disclosure can generally be prepared by conventional techniques known to those of ordinary skill in the art or by processes and methods analogous to those described herein, using an appropriate isotopically labeled reagent in place of the non-labeled reagent otherwise employed.

According to a first aspect, the present disclosure relates to a drilling fluid including an oil phase, an organophilic phyllosilicate, and a weighting agent. In one embodiment, the drilling fluid further comprises an aqueous phase dispersed in the oil phase.

Phyllosilicate, or sheet silicate, forms parallel sheets of tetrahedral silicate where each silicate sheet contains $Si_4O_{10}$ or has a molar ratio of Si:O of 2:5. Examples of phyllosilicate include serpentine, clay minerals, mica, and chlorite. Preferably, phyllosilicate of the present disclosure may refer to a type of clay mineral.

Clay minerals are characterized by two-dimensional sheets of corner sharing $SiO_4$ tetrahedra and/or $AlO_4$ octahedra. The sheet units have the chemical composition $(Al, Si)_3O_4$. Each silica tetrahedron shares 3 of its vertex oxygen atoms with other tetrahedra forming a hexagonal array in two-dimensions. The fourth vertex is not shared with another tetrahedron and all of the tetrahedra "point" in the same direction; i.e. all of the unshared vertices are on the same side of the sheet.

In clay minerals, the tetrahedral sheets are bonded to octahedral sheets formed from small cations, such as aluminum, magnesium, and lithium, and are coordinated by six oxygen atoms. Each unshared vertex from the tetrahedral sheet also forms part of one side of the octahedral sheet, but an additional oxygen atom is located above the gap in the tetrahedral sheet at the center of the six tetrahedra. This oxygen atom is bonded to a hydrogen atom forming an OH group in the clay structure. Clay minerals can be categorized depending on the way that tetrahedral and octahedral sheets are packaged into layers. If there is only one tetrahedral and one octahedral group in each layer, the clay is known as a 1:1 clay. The alternative, known as a 2:1 clay, has two tetrahedral sheets with the unshared vertex of each sheet pointing towards each other and forming each side of the octahedral sheet. In other words, a tetrahedral double layer sandwiches an octahedral layer.

Bonding between the tetrahedral and octahedral sheets may require that the tetrahedral sheet becomes corrugated or twisted, causing ditrigonal distortion to the hexagonal array, and the octahedral sheet may be flattened. This minimizes the overall bond-valence distortions of the crystallite. Depending on the composition of the tetrahedral and octahedral sheets, the layer will have no charge, or will have a net negative charge. If the layers are charged this charge is balanced by interlayer cations such as Na$^+$ or K$^+$. In each case, the interlayer may contain water. The crystal structure is formed from a stack of layers interspaced with the interlayers.

The organophilic phyllosilicate of the present disclosure comprises an ion-exchange reaction product of a clay mineral, preferably a smectite-type clay, and a compound of formula (I)

(I)

or a salt thereof, a solvate thereof, a tautomer thereof, a stereoisomer thereof, or a mixture thereof.

Exemplary types of clay mineral include, but are not limited to, smectite, kaolin, illite, chlorite, sepiolite, attapulgite, or some other type. Smectites include dioctahedral smectites such as montmorillonite, nontronite, bentonite, and beidellite, as well as trioctahedral smectites such as saponite, hectorite, and stevensite. In general, dioctahedral smectites have an average of 2 of every 3 octahedral sites occupied by a cation, while trioctahedral smectites have approximately all 3 of every 3 octahedral sites occupied by a cation. Kaolins include the minerals kaolinite, dickite, halloysite, and nacrite. Illites include clay-micas and illite. Chlorites include baileychlore, chamosite, clinochlore, cookeite, donbassite, gonyerite, nimite, odinite, orthochamosite, pennantite, ripidolite, and sudoite. Other 2:1 clay types exist such as sepiolite or attapulgite. Preferably, the clay mineral described herein is a smectite-type clay. The smectite-type clay may be a natural clay or a synthetic clay. In at least one embodiment, the clay mineral used herein is devoid of hectorite and attapulgite clays.

Bentonite clay may contain a mixture of clay species such as montmorillonite, illite, and/or kaolinite. In one or more embodiments, the clay mineral is the smectite-type clay that includes a bentonite, preferably a bentonite containing at least 60 wt % of a montmorillonite with a general empirical formula of $(Na,Ca)_{0.33}(Al,Mg)_2(Si_4O_{10})(OH)_2$, preferably at least 70 wt %, more preferably at least 80 wt % of the montmorillonite relative to a total weight of the bentonite. It is equally envisaged that the clay mineral may contain other clay types as previously specified, preferably other smectite-type clays in addition to or in lieu of the bentonite. For example, the clay mineral may include a mixture of nontronite, beidellite, saponite, and/or stevensite in addition to or in lieu of the bentonite. Preferably, the bentonite is present in the smectite-type clay in an amount greater than 50 wt %, preferably greater than 70 wt %, more preferably greater than 90 wt %, relative to a total weight of the smectite-type clay.

Because of substitution of lower valence cations, smectite-type clays carry a net negative charge on the clay sheets that may be neutralized by metal cations that are positioned on the surfaces of the clay. For example, due to isomorphous substitution of Mg for Al in the central alumina plane, montmorillonite carries a net negative charge that can attract cations such as sodium and calcium ions. In one embodiment, the smectite-type clay of the present disclosure has exchangeable inorganic cations. Preferably, the exchangeable inorganic cations of the smectite-type clay may be sodium, calcium, potassium, magnesium, or some other cation. Most preferably, the exchangeable cations are sodium, calcium, or both.

As used herein, the term "cation-exchange capacity" ("CEC") refers to the amount of positive charge that can be exchanged per mass of clay. An equivalent unit of milliequivalent per 100 grams (meq/100 g) is centimole per kilogram (cmole/kg), where cmole represents the molar amount of exchangeable positive charge. Measurements of cation-exchange capacity are known to those of ordinary skill in the art. For example, the cation exchange capacity may be determined as the amount of cations that can be ion exchanged with a 1 M solution of ammonium acetate at pH of about 7. In one embodiment, the smectite-clay has a cation-exchange capacity of at least 50 meq of exchangeable cations per 100 grams of the clay, preferably 75-300 meq of exchangeable cations per 100 grams of the clay, more preferably 100-200 meq of exchangeable cations per 100 grams of the clay, at pH of 6-8, 6.5-7.5, or about 7.

The exchangeable inorganic cations of the smectite-type clays may be exchanged with cations, preferably organic cations of a salt that is in contact with the smectite-type clay. The organophilic phyllosilicate of the present disclosure comprises an ion-exchange reaction product of the clay mineral, preferably the aforementioned smectite-type clay, and a compound of formula (I)

(I)

or a salt thereof, a solvate thereof, a tautomer thereof, a stereoisomer thereof, or a mixture thereof. As used herein, quaternary ammonium salts are compounds having a quaternary ammonium cation which is a positively charged central nitrogen atom with four substituents, especially alkyl and/or aryl groups, discounting hydrogen, and a counter anion. In one embodiment, the compound of formula (I) is a quaternary ammonium salt.

The term "anion" means a negatively charged ion including, but not limited to, halides, such as fluoride, chloride, bromide, and iodide, nitrate, sulfate, phosphate, methanesulfonate, ethanesulfonate, p-toluenesulfonate, salicylate, malate, maleate, succinate, tartrate, citrate, acetate, perchlorate, trifluoromethanesulfonate, acetylacetonate, tetrafluoroborate, hexafluorophosphate, and hexafluoroacetylacetonate. In one embodiment, X of the compound of formula (I) is an anion selected from the group consisting of a hexafluorophosphate ion, a trifluoromethanesulfonate ion, a tetrafluoroborate ion, and a halide ion. In a preferred embodiment, X is a halide, such as a chloride, a bromide, a fluoride, and an iodide. Most preferably, X is a chloride.

$R_1$ is selected from the group consisting of a hydrogen, an optionally substituted alkyl, an optionally substituted alkenyl, and an optionally substituted aryl.

Preferably, $R_1$ is not a saturated alkyl. In one or more embodiments, $R_1$ is an alkenyl having a degree of unsaturation of 1-5, 2-4, or 3. Most preferably, $R_1$ is an alkenyl having a degree of unsaturation of 1. Each double bond of $R_1$ may have substituents arranged in cis or trans conformation. In one or more embodiments, $R_1$ is an optionally substituted $C_{2-20}$ alkenyl, preferably an optionally substituted $C_{3-18}$ alkenyl, preferably an optionally substituted $C_{4-16}$ alkenyl, preferably an optionally substituted $C_{5-14}$ alkenyl, preferably an optionally substituted $C_{6-12}$ alkenyl, preferably an optionally substituted $C_{7-10}$ alkenyl. The carbon counts described herein refers to a number of carbon atoms of the alkenyl group of $R_1$ which excludes the carbon atoms of optionally present substituents. In a preferred embodiment, $R_1$ is a linear alkenyl. Alternatively, $R_1$ is a branched alkenyl, such as $CH_2$=$C(CH_3)$—*, and $C(CH_3)_2$—$C(CH_3)$—*.

In a further embodiment, $R_1$ is a substituted alkenyl, preferably an alkenyl substituted with one or more halogens (e.g. chloro, bromo, iodo, fluoro), more preferably $R_1$ is a $C_{2-7}$ alkenyl, $C_{3-6}$ alkenyl, or $C_{4-5}$ alkenyl substituted with one or more halogens. For example, $R_1$ is ClCH=CH—*, BrCH=CH—*, FCH=CH—*, Cl₂C=CH—*, and Br₂C=CH—*. In a most preferred embodiment, R₁ is ClCH=CH—*.

Alternatively, R₁ is an optionally substituted $C_{1-6}$ alkyl, an optionally substituted $C_{2-5}$ alkyl, or an optionally substituted $C_{3-4}$ alkyl. For example, R₁ is a methyl, ethyl, an n-propyl, an isopropyl, an n-butyl, and a dimethylaminomethyl. In another alternative embodiment, R₁ is an optionally substituted aryl, such as a phenyl.

R₂ and R₃ are independently a hydrogen, or an optional substituted alkyl. In one embodiment, R₂ and R₃ are independently an optionally substituted $C_{1-6}$ alkyl, an optionally substituted $C_{2-5}$ alkyl, or an optionally substituted $C_{3-4}$ alkyl. R₂ and R₃ may be the same or different, preferably the same. In a preferred embodiment, R₂ and R₃ are a hydrogen.

In a preferred embodiment, the compound of formula (I) is

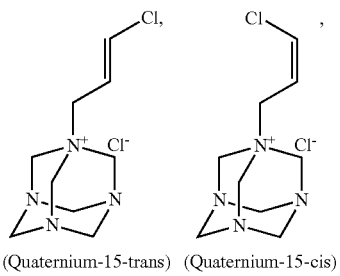 [SMILES: Cl/C=C/C[N+]12CN3CN(CN(C3)C1)C2 ; [Cl-] ; Cl/C=C\C[N+]12CN3CN(CN(C3)C1)C2 ; [Cl-]]

(Quaternium-15-trans)  (Quaternium-15-cis)

or both. In a related embodiment, the double bond of R₁ has substituents arranged in cis conformation. However, the compound of formula (I) may contain a mixture of trans and cis isomers, or trans isomer only. For example, the cis isomer (Quaternium-15-cis) may be present in an amount of 0.1-99.9 wt %, 0.5-95 wt %, 1-90 wt %, 2-80 wt %, 3-70 wt %, 4-60 wt %, 5-50 wt %, 10-40 wt %, or 20-30 wt % relative to a total weight of the compound of formula (I), with the remaining weight percentage comprising other compounds of formula (I), preferably the trans isomer (Quaternium-15-trans).

In one embodiment, the compound of formula (I) of the present disclosure is Dowicil®, which is Quaternium-15-cis, and/or Quaternium-15-trans manufactured by DuPont (formerly Dow Chemical Company). Exemplary Dowicil® products applicable to the present disclosure include, but are not limited to, Dowicil® 150, Dowicil® 200, Dowicil® 75, and Dowicil® 100.

The ion-exchange reaction may be partially completed or driven to completion. In one embodiment, at least 50 mol % of exchangeable cations of the aforementioned smectite-type clay are ion exchanged with the quaternary ammonium cations of the compound of formula (I), preferably 55-95 mol %, preferably 60-90 mol %, preferably 65-85 mol %, preferably 70-80 mol %, preferably 75-78 mol % of exchangeable cations of the aforementioned smectite-type clay are ion exchanged with the quaternary ammonium cations of the compound of formula (I).

In one embodiment, the ion-exchange reaction of the smectite-type clay and the compound of formula (I) is performed in the presence of a solvent, preferably a polar solvent. Exemplary polar solvents include, but are not limited to, water, methanol, ethanol, 1-propanol, isopropanol, ethylene glycol, propylene glycol, glycerol, or mixtures thereof.

The synthetic phyllosilicate may be prepared by reacting the smectite-type clay and the compound of formula (I) in the presence of a solvent via methods known to those of ordinary skill in the art. For example, a suspension of the clay and the solvent (e.g. water) may be mixed with the compound of formula (I) to form a reaction mixture. Mixings may occur via stirring, shaking, swirling, sonicating, blending, or by otherwise agitating a reaction mixture. In one embodiment, the reaction mixture is stirred by a magnetic stirrer or an overhead stirrer. In another embodiment, the reaction mixture is left to stand (i.e. not stirred). Alternatively, the reaction mixture is subjected to ultrasonication. The ultrasonication may be performed using an ultrasonic bath or an ultrasonic probe. The reaction mixture may be agitated at a temperature of 4-80° C., 10-50° C., or 20-35° C.

After mixing the smectite-type clay and the compound of formula (I) in the presence of the solvent, the ion-exchange reaction is allowed to take place for an appropriate time to partially or fully ion exchange the exchangeable cations of the smectite-type clay with the quaternary ammonium cations of the compound of formula (I). In one embodiment, the ion-exchange reaction is carried out for 0.5-24 hours, 1-12 hours, or 2-6 hours. Once the ion-exchange reaction is deemed sufficiently complete, a solid may be separated from the reaction mixture and dried to remove the solvent, thereby forming the organophilic phyllosilicate.

In one embodiment, the organophilic phyllosilicate of the present disclosure has a bulk density of 75-250 kg/m³, preferably 100-200 kg/m³, more preferably 110-150 kg/m³, even more preferably 115-125 kg/m³, or about 120 kg/m³. In a related embodiment, the organophilic phyllosilicate has a specific weight of 1.1-2.5 g/cm³, preferably 1.2-2.2 g/cm³, more preferably 1.3-2.0 g/cm³, even more preferably 1.4-1.8 g/cm³, most preferably 1.5-1.7 g/cm³.

In one embodiment, the organophilic phyllosilicate of the present disclosure has a water content of less than 12 wt %, preferably less than 10 wt %, more preferably less than 8 wt %, even more preferably less than 6 wt %, for example a water content of 5.5 wt %, 5 wt %, 4 wt %, 3 wt %, or 2 wt %, relative to a total weight of the organophilic phyllosilicate.

In one embodiment, the organophilic phyllosilicate is present in an amount of 500-40,000 mg/L, preferably 1,000-20,000 mg/L, more preferably 2,000-10,000 mg/L, even more preferably 3,000-7,000 mg/L, or about 4,500 mg/L relative to a total volume of the drilling fluid. In a related embodiment, the organophilic phyllosilicate is present in an amount of 0.14-14 lb/bbl, preferably 0.35-7 lb/bbl, more preferably 0.7-3.5 lb/bbl, even more preferably 1.05-2.45 lb/bbl relative to a total volume of the drilling fluid.

In one embodiment, less than 8,000 mg/L, preferably less than 6,000 mg/L, more preferably about 4,286 mg/L of organophilic phyllosilicate present is sufficient to prevent sagging of the drilling fluid (see discussions hereinafter), although greater amounts of the organophilic phyllosilicate may be utilized.

The drilling fluid of the present disclosure may also comprise a weighting agent. Weighting agents are commonly used to modify the density of drilling fluids. Barite or baryte (barium sulphate) is a typical weighting agent containing barium sulfate ($BaSO_4$), although other minerals may be used. Preferably the weighting agent may be present to produce a desired bulk density in the drilling fluid. In preferred embodiments, the weighting agent comprises barite. Weighting agents other than barite can be used in any of the embodiments described herein. Other weighting agents include minerals such as hematite, magnetite, iron oxides, illmenite, siderite, celestite, dolomite, olivine, calcite, magnesium oxides, halites, calcium carbonate, strontium sulfate, manganese tetraoxide, and the like. Other weighting agents can also be envisioned by those of ordinary skill in the art.

In one or more embodiments, the weighting agent is present in the drilling fluid in an amount of 100-4,000 g/L, 200-2,000 g/L, 400-1,500 g/L, or 800-1,000 g/L relative to a total volume of the drilling fluid. However, the weighting agent may be present in an amount less than 100 g/L or greater than 4,000 g/L relative to a total volume of the drilling fluid. In a related embodiment, the weighting agent is present in the drilling fluid in an amount of 35-1,400 lb/bbl, 70-700 lb/bbl, 140-525 lb/bbl, or 280-350 lb/bbl relative to a total volume of the drilling fluid. In one embodiment, a weight ratio of the weighting agent to the organophilic phyllosilicate ranges from 50:1 to 300:1, 75:1 to 250:1, 100:1 to 200:1, or about 150:1.

In one embodiment, the oil phase is an oil-based fluid, which may comprise one or more of diesel oil, petroleum oil, fuel oil, biodiesel, biomass to liquid (BTL) fuel, gas to liquid (GTL) diesel, mineral oil, an ester, an alpha-olefin, a natural oil, and derivatives and/or combinations thereof. In a preferred embodiment, the oil phase comprises diesel oil. In one embodiment, the drilling fluid may be considered an all oil-based drilling fluid.

In one or more embodiments, the drilling fluid comprises an oil-based invert emulsion which has an aqueous phase dispersed in the oil phase. As used herein, oil-based invert emulsions have an oil "continuous" phase and an aqueous internal phase. The term "emulsion" is commonly used to describe systems in which water is the external or continuous phase and oil is dispersed within the external phase. The term "invert" indicates that the oil is the continuous or external phase and that an aqueous fluid is instead the internal phase. In some embodiments, the oil phase may include up to 40% by weight, preferably 5-30% by weight, preferably 10-20% by weight of an aqueous phase dispersed therein, for example, in the form of an invert emulsion. The weight percentiles are relative to a total weight of the liquid phase (i.e. the emulsion having the aqueous phase dispersed in the oil phase). In one embodiment, a volume ratio of the oil phase to the aqueous phase is in a range of 5:1 to 1.2:1, preferably 4:1 to 1.5:1, more preferably 3:1 to 2.4:1. In at least one embodiment, the drilling fluid may be considered an oil-based drilling fluid.

Any water containing solution, including saltwater, hard water, and/or fresh water may be used in forming the internal phase of the oil-based fluid or as the water-based fluid. For purposes of this description, the term "saltwater" includes saltwater with a chloride ion content of between about 6,000 ppm and saturation, and is intended to encompass seawater and other types of saltwater including groundwater comprising additional impurities typically found therein. The term "hard water" includes water having mineral concentrations between about 2000 mg/L and about 300,000 mg/L. The term "fresh water" includes water sources that comprise less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Exemplary salts that may be present in saltwater, hard water, and/or fresh water include, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. The water used herein may be supplied from a natural source, such as an aquifer, a lake, and/or an ocean, and may be filtered to remove large solids before being used in the drilling fluid.

In one or more embodiments, the drilling fluid further comprises at least one additive selected from the group consisting of an emulsifier, a viscosifier, a fluid-loss control agent, and a bridging agent.

Emulsifiers or surfactants can be added to the drilling fluid in order to form a more stable emulsion. Exemplary emulsifiers include, but are not limited to, organic acids such as monocarboxyl alkanoic, alkenoic, or alkynoic fatty acids (e.g., stearic, oleic, caproic, capric, butyric acids), aliphatic dicarboxylic acids (e.g., adipic acid), alkylpyridines, amido amines, polyamides, polyamines, imidazoline derivatives, and oxidized crude tall oil. In one embodiment, the emulsifier may be INVERMUL®, EZ-MUL® (both trademarks of Halliburton), or both. In one embodiment, the emulsifier is present in an amount of 0.5-40 lb/bbl, preferably 1-20 lb/bbl, more preferably 2-10 lb/bbl, even more preferably 3-5 lb/bbl, or about 4 lb/bbl relative to a total volume of the drilling fluid.

Viscosifiers may also be called "thickeners," and are used to increase the viscosity of a drilling fluid. Exemplary viscosifiers include, but are not limited to, bauxite, bentonite, dolomite, limestone, calcite, vaterite, aragonite, magnesite, taconite, gypsum, quartz, marble, hematite, hectorite, bentonite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, xanthan gum (XC-polymer), xanthan gum, guar gum, glycol, carboxymethylcellulose, polyanionic cellulose, and the like. Preferably, the viscosifier is an oil-based mud (OBM) viscosifier. In one embodiment, the viscosifier may be GELTONE® II, available from Halliburton. In one embodiment, the viscosifier is present in an amount of 2-100 lb/bbl, preferably 4-50 lb/bbl, more preferably 8-25 lb/bbl, even more preferably 10-15 lb/bbl, or about 12 lb/bbl relative to a total volume of the drilling fluid.

Fluid-loss control agents limit the loss of drilling fluids into permeable formations. In other words, fluid-loss control agents limit the amount of filtrate that permeates into a permeable formation. Fluid-loss control agents may also be called "fluid loss agents," or "filtration control additives." These include but are not limited to, starch, guar gum, carboxymethyl cellulose, crospovidone, croscarmellose sodium, sodium starch glycolate polysaccharides, polyanionic cellulose polymer, and acrylic polymers such as polyacrylamide, or a clay deflocculant. Starch includes but is not limited to corn starch, tapioca starch, and potato starch. In one embodiment, the fluid-loss control agent may be DURATONE® II, available from Halliburton, or some other fluid-loss control agent. In one embodiment, the fluid-loss control agent is present in an amount of 1-80 lb/bbl, preferably 2-40 lb/bbl, more preferably 4-20 lb/bbl, even more preferably 6-10 lb/bbl, or about 8 lb/bbl relative to a total volume of the drilling fluid.

In some embodiments, certain additives may have more than one function, or may be grouped with one or more additives. For instance, Xanthan gum may be considered both a viscosifier and a fluid loss control additive.

The role of the bridging agent may be to insert into the pore openings of a formation and prevent loss of drilling fluid. The bridging agent may be calcium carbonate, other suspended salts, or resins. Preferably the bridging agent is calcium carbonate ($CaCO_3$). In one embodiment, the bridging agent is present in an amount of 3-300 lb/bbl, preferably 6-150 lb/bbl, more preferably 15-75 lb/bbl, even more preferably 25-50 lb/bbl, or about 30 lb/bbl relative to a total volume of the drilling fluid.

The drilling fluid of the present disclosure may optionally comprise any number of additional additives. For instance, the drilling fluid may comprise a metal hydroxide for pH adjustment. The metal hydroxide may be NaOH, KOH, LiOH, $Ca(OH)_2$ (i.e. lime) or some other metal hydroxide. Preferably the metal hydroxide is lime. Examples of other additional additives include, without limitation, defoamers, clay stabilizers, antiscalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, oils, and the like. One or more of these additives may comprise degradable materials that are capable of undergoing irreversible degradation downhole. A person skilled in the art, with the benefit of this disclosure, will recognize the types of additives that may be included in the drilling fluid for a particular application, without undue experimentation.

The drilling fluid may be prepared by any suitable means known in the art. In some embodiments, the drilling fluid may be prepared at a well site or at an offsite location. Once prepared, the drilling fluid may be placed in a tank, bin, or other container for storage and/or transport to the site to use. In other embodiments, the drilling fluid may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the ongoing treatment. In some embodiments, the drilling fluid may be made by a specific order of adding and mixing components. For instance, the organophilic phyllosilicate may be added before the bridging agent. In some embodiments, mixing may proceed for a period of 1-30 minutes, 5-20 minutes, or about 10 minutes following the addition of each component, or similar components (for instance two fluid loss control agents may be added simultaneously while mixing). In one embodiment, the drilling fluid may be formed by mixing the components shown in Table 1.

In one embodiment, the drilling fluid of the present disclosure has a density in a range of 14-20 pounds per gallon (ppg), 14.5-19 ppg, 15-18 ppg, or 16-17 ppg. This density may be obtained at a temperature in a range of 60-400° F., 80-300° F., or 100-200° F.

Generally, increased viscosity leads to improved suspension of weighting agents which in turn limits or reduces problematic "sag." However, excessive viscosity can have adverse effects on equivalent circulating density (causing it to increase), which can also lead to problems, particularly in wells where the differences in subterranean formation pore pressures and fracture gradients are small, as commonly encountered in deep water wells.

Under certain well conditions, including without limitation, well geometries, temperatures, and pressures, a phenomenon called "barite sag" or "sag" can occur. "Sag" is generally a significant variation in mud density (>0.5 lbm/gal) along the mud column, which is the result of settling of the weighting agent or weight material and other solids in the drilling fluid. Sag generally results from the inability of the drilling fluid under the particular well conditions to provide adequate suspension properties. Sag may result in formation of a bed of the weighting agents on the low side of the wellbore, and stuck pipe, among other things. In some cases, sag may be deleterious to a drilling operation and lead to hole abandonment.

As described herein, the "sag factor" is the ratio of the bottom density to the sum of the top and bottom densities, each of the same volume of drilling fluid and following a certain time period of aging. "Sag" generally refers to the tendency of a weighting agent to migrate or settle to the bottom, causing an increase in the sag factor. Suspensions of solids in non-vertical columns are known to settle faster than suspensions in vertical ones. This effect is driven by gravity and impeded by fluid rheology, particularly non-Newtonian and time dependent rheology.

A sag factor of exactly 0.5 refers to no difference in top and bottom densities (for both vertical and non-vertical columns), and thus no sag tendency. Some amount of sag is considered acceptable, for instance, drilling fluids that show a sag factor in a range of 0.50-0.53 after aging.

In one embodiment, the sag factor may be measured from a column of fluid having a length of about 11 cm. In a further embodiment, column of fluid may be housed in an aging cell with a headspace of about 2 cm. For a vertical sag factor measurement, the top density may be measured about 1 cm below the fluid surface, and the bottom density may be measured about 10 cm below the fluid surface (or about 1 cm from the bottom of the column). For an inclined sag factor measurement, the top density may be measured about 1 cm directly below the fluid surface, or 1 cm below the fluid surface parallel to a sidewall of the aging cell. Similarly, the bottom density for an inclined cell may be measured 10 cm below the fluid surface parallel to a sidewall of the aging cell.

Drilling fluids in deviated wellbores can exhibit sag in both static and dynamic situations. In this context, static is a totally quiescent fluid state, such as when drilling has ceased; dynamic is any situation where the fluid is exposed to a shear stress, such as for example during drilling. As used hereinafter, the term "sag" shall be understood to include both static and dynamic sag unless specifically indicated otherwise. In one embodiment, the sag described here is static, meaning that the sag is measured on a drilling fluid in an aging cell not exposed to shear stress. Alternatively, dynamic sag is measured in an aging cell with an applied shear stress.

In one embodiment, the drilling fluid has a static sag factor in a range of 0.500-0.510, preferably 0.501-0.508, more preferably 0.502-0.506, even more preferably 0.504-0.505, at a vertical condition at a temperature of 180-500° F., preferably 250-450° F., more preferably 300-400° F., or about 350° F., and a pressure of 300-800 psi, preferably 400-700 psi, more preferably 450-650 psi, or about 500 psi. This sag factor may be measured after aging the drilling fluid at the previously described temperature and pressure conditions for a time period of 6-96 h, preferably 12-48 h, more preferably 18-36 h, or about 24 h. In a further embodiment, with the above conditions, the sag factor is 95% or less, preferably 92% or less, more preferably 90% or less, or 87% or less, or 85% or less of a sag factor of a substantially similar drilling fluid that does not comprise the organophilic phyllosilicate (see FIGS. 2 and 10).

Figure 1B:
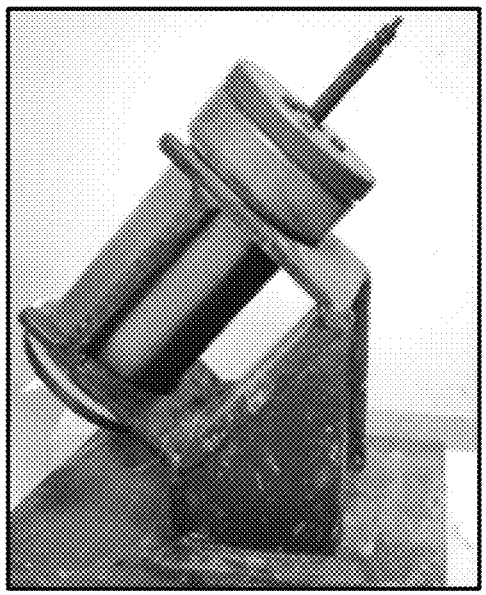
FIG. 1B shows the sag test set up at an inclined condition.

As described herein, the "inclined position" means that the aging cell or other vessel containing the drilling fluid, is positioned at an angle in a range of 30-60°, preferably 35-55°, more preferably 40-50°, or about 45° from the vertical. FIG. 1B shows an example of an aging cell at an inclined position; FIG. 1A shows a disassembled aging cell having parts in a vertical position.

In one embodiment, the drilling fluid at an inclined position has a static sag factor in a similar range (or most preferably, in a range of 0.500-0.510, or 0.505-0.507), at similar temperature, pressure and aging conditions. With these conditions and at the inclined position, the sag factor is 90% or less, 87% or less, preferably 85% or less, or 83% or less of a sag factor of a substantially similar drilling fluid at a similar incline that does not comprise the organophilic phyllosilicate (see FIG. 3).

Alternatively, the drilling fluid has a dynamic sag factor in a range of 0.500-0.515, preferably 0.502-0.512, more preferably 0.505-0.511, even more preferably 0.508-0.510 with a shear rate of 50-200 rpm, 75-150 rpm, 90-110 rpm, or about 100 rpm, at a temperature of 80-250° F., preferably 90-200° F., more preferably 100-150° F., or about 120° F., and a pressure of 0.8-2 atm, 0.9-1.5 atm, or about 1 atm. The dynamic sag factor may be measured on a Fann® rheometer. In a further embodiment, with the above conditions, the dynamic sag factor is 50% or less, preferably 45% or less, more preferably 40% or less, or 36% or less, of a dynamic sag factor of a substantially similar drilling fluid that does not comprise the organophilic phyllosilicate (see FIGS. 4 and 11).

As used herein, the term "gel strength" refers to the shear stress measured at a low shear rate after a drilling fluid has set quiescently for a set period of time. According to standard API procedures, the gel strength is measured after setting for 10 seconds and 10 minutes, although measurements at longer time intervals can also be made such as, for example, 30 minutes or 16 hours.

In one embodiment, the drilling fluid has a ten-second gel strength of 22-30 lb/100 ft$^2$, preferably 23-28 lb/100 ft$^2$, more preferably 24-26 lb/100 ft$^2$, or about 25 lb/100 ft$^2$, a ten-minute gel strength of 26-35 lb/100 ft$^2$, preferably 27-32 lb/100 ft$^2$, more preferably 27.5-29 lb/100 ft$^2$, or about 28 lb/100 ft$^2$, and a thirty-minute gel strength of 33-40 lb/100 ft$^2$, preferably 34-38 lb/100 ft$^2$, more preferably 34.5-36 lb/100 ft$^2$, or about 35 lb/100 ft$^2$. These gel strengths may be measured at a temperature of 180-500° F., preferably 250-450° F., more preferably 300-400° F., or about 350° F.

As used herein, the term "yield point" refers to a parameter of the Bingham plastic model, where yield point refers to the yield stress extrapolated to a shear rate of zero. In one embodiment, the drilling fluid has a yield point in a range of 34-42 lb/100 ft$^2$, preferably 35-39 lb/100 ft$^2$, more preferably 35.5-37 lb/100 ft$^2$, or about 36 lb/100 ft$^2$, at a temperature of 180-500° F., preferably 250-450° F., more preferably 300-400° F., or about 350° F.

"Plastic viscosity" (PV) is another parameter of the Bingham plastic model, which represents the slope of the shear stress/shear rate line above the yield point. In one embodiment, the drilling fluid has a plastic viscosity of 20.5-25 cP, preferably 20.6-23 cp, more preferably 20.8-22 cp, or about 21 cp, at a temperature of 180-500° F., preferably 250-450° F., more preferably 300-400° F., or about 350° F.

Storage modulus G' measures the stored energy representing the elastic portion of the viscoelastic behavior in viscoelastic materials. In one embodiment, the drilling fluid has a storage modulus in a range of 500-4,000 Pa, preferably 600-2,000 Pa, more preferably 800-1,500 Pa, even more preferably 1,000-1,200 Pa, with an angular frequency of 0.1-150 rad/s, 0.5-100 rad/s, 1-50 rad/s, or 10-25 rad/s, at a temperature of 80-250° F., preferably 90-200° F., more preferably 100-150° F., or about 120° F., and a pressure of 0.8-2 atm, 0.9-1.5 atm, or about 1 atm. In a further embodiment, with the above conditions, the storage modulus of the drilling fluid is at least 40% greater, preferably at least 60% greater, more preferably at least 70% greater, or about 80% more than that of a substantially similar drilling fluid that does not comprise the organophilic phyllosilicate over the entire frequency range (see FIG. 7).

Preferably, the presence of the organophilic phyllosilicate does not significantly affect filtration performance. In one embodiment, the drilling fluid has a filtrate volume that is within 7%, preferably with 5%, more preferably within 4% of the filtrate volume of a substantially similar drilling fluid that does not have the organophilic phyllosilicate and is subjected to the same filtration conditions. In a related embodiment, the drilling fluid has a filtrate thickness that is within 5%, preferably with 3%, more preferably within 1% of the filtrate thickness of a substantially similar drilling fluid that does not have the organophilic phyllosilicate and is subjected to the same filtration conditions. In another related embodiment, the drilling fluid has a filtrate cake weight that is within 21%, preferably with 18%, more preferably within 17% of the filtrate cake weight of a substantially similar drilling fluid that does not have the organophilic phyllosilicate and is subjected to the same filtration conditions. In one embodiment, these filtration conditions may involve a pressure difference in a range of 200-900 psi, preferably 300-750 psi, more preferably 400-600 psi, or about 500 psi. A median pore size of the permeable formation or of the filtration medium may be in a range of 1-100 μm, 10-80 μm, or 30-70 μm. In one embodiment, the filtrate volume, thickness, and filtrate cake weight may be measured after a filtration time period in a range of 10-60 minutes, 20-50 minutes, or 30-40 minutes.

According to a second aspect, the present disclosure relates to a method of drilling a subterranean geological formation. The method involves drilling the subterranean geological formation to form a wellbore therein, and circulating the drilling fluid of the first aspect in any of its embodiments into the wellbore during the drilling. The organophilic phyllosilicate prevents sagging of the weighting agent in the wellbore. In one embodiment, the wellbore is a vertical wellbore, a horizontal wellbore, a multilateral wellbore, or an extended reach wellbore. A pumping system may be used to circulate the drilling fluid in the wellbore during the drilling.

The drilling fluid may be used during or in conjunction with other operations, such as pre-flush treatments, after-flush treatments, hydraulic fracturing treatments, sand control treatments (e.g., gravel packing), "frac pack" treatments, acidizing treatments (e.g., matrix acidizing or fracture acidizing), wellbore clean-out treatments, cementing operations, workover treatments/fluids, and other operations where the drilling fluid may be useful. In this sense, the drilling fluid may also be considered a completion or workover fluid.

The examples below are intended to further illustrate protocols for preparing, characterizing the drilling fluid, and uses thereof, and are not intended to limit the scope of the claims.

Example 1

Materials

The invert emulsion drilling fluid (IEDF) contained diesel as a continuous or external phase and water as dispersed or internal phase. The diesel to water ratio was 80/20. A primary emulsifier (INVERMUL®, available from Halliburton, 11 g) was used to form a stable emulsion. Lime (6 g) was used for removing any contaminates. A fluid loss control agent (Duratone® II, available from Halliburton, 7 g) was used to reduce and prevent the filtration. Calcium chloride (32 g) was used for shale stabilization. A viscosifier (Geltone® II, available from Halliburton, 10 g) was used to increase the viscosity of the IEDF. A secondary emulsifier (EZ-Mul®, available from Halliburton, 4 g) was used to enhance the emulsion stability. Calcium carbonate (30 g) was added as a bridging material and barite was used as a weighting material (300 g). Table 1 lists the drilling fluid additives that were included to prepare the IEDF.

TABLE 1

Invert emulsion drilling fluid formulation for lab preparation equivalent to 1 bbl

| Additive | Amount | Unit |
|---|---|---|
| Diesel | 0.49 | 350 cm³ |
| Primary Emulsifier | 11 | g |
| Contaminate remover | 6 | g |
| Fluid loss control | 7 | g |
| Water | 0.14 | 350 cm³ |
| CaCl$_2$ | 32 | g |
| OBM Viscosifier | 10 | g |
| Emulsifier | 4 | g |
| New anti-sagging (OP) | 0-2 | g |
| Bridging Material | 30 | g |
| Weighting Material | 300 | g |

The new anti-sagging additive organophilic phyllosilicates (OP) has a bulk density of 120 kg/m³, water content of less than 6%, and a specific weight of 1.5 to 1.7 g/cm³. The OP was added to the drilling fluid in different amounts ranging from 0.5 g to 2.0 g, and the drilling fluid properties were measured at different pressure and temperature conditions.

TABLE 2

Nomenclatures

| | |
|---|---|
| IEDF | Invert emulsion drilling fluid |
| OP | Organophilic phyllosilicates |
| VSST | Viscometer sag shoe test |
| PV | Plastic viscosity, cP |
| YP | Yield Point, lb/100 ft² |

Example 2

Drilling Fluid Preparation

The IEDF was prepared and mixed at ambient conations using a high speed mixer. Diesel was put in the cub first and different additives were added sequentially at high speed mixing. Each additive was mixed for at least 10 minutes to ensure good distribution of the additive in the IEDF and to allow the additive to build its own property. The new anti-sagging additive (OP) was added before the calcium carbonate and mixed for 10 minutes. Different drilling fluid formulations were prepared with different amounts (e.g. 0, 0.5, 1.0, 1.5, and 2.0 g) of OP additive.

Example 3

Sag Tests

Static sag tests were performed to investigate the impact of the new anti-sagging additive on barite sag tendency. The drilling fluid sample was mixed for 10 minutes before being poured into the aging cell. The cell was pressurized with 500 psi using nitrogen gas then heated in the oven at specific temperature and static conditions for 24 hours. After 24 hours, the cell was cooled down and depressurized. Then, syringes were used to take fluids from the top and the bottom of the drilling fluid sample to evaluate the density. Then, the sag factor was calculated for all drilling fluid samples using Eq. 1. Sag test was conducted at vertical and inclined (45 degree) conditions.

Alabdullatif et al. and Maxey suggested that a sag factor in the range of 0.5-0.53 was acceptable, while a sag factor higher than 0.53 indicated solids settlement [Alabdullatif, Z., Al-yami, A., Wagle, V., Bubshait, A., Al-safran, A., 2015. Development of New Kill Fluids with Minimum Sagging Problems for High Pressure Jilh Formation in Saudi Arabia. Saudi Aramco Journal of Technology, (Spring); and Maxey, J. 2007. Rheological Analysis of Static and Dynamic Sag in Drilling Fluids. Annual Transactions of the Nordic Rheology Society, 15: pp. 181-188, each incorporated herein by reference in their entirety]. FIGS. 1A and B show static sag test setup at vertical and inclined conditions.

$$\text{Sag Factor} = \frac{\rho_{Bottom}}{\rho_{Bottom} + \rho_{Top}} \qquad (\text{Eq. 1})$$

where, $\rho_{Bottom}$=Bottom density, ppg
$\rho_{Top}$=Top density, ppg

Dynamic sag test was conducted for the IEDF with and without the OP to evaluate the sag tendency under dynamic conditions. The test was performed using Fan rheometer at 100 rpm and 120° F. Elkatatny [Elkatatny, S. M. 2018. Enhancing the Stability of Invert Emulsion Drilling Fluid for Drilling in High-Pressure High-Temperature Conditions. Energies, 11(9), 2393, incorporated herein by reference in its entirety] explained the detailed steps for performing the sag test under dynamic conditions.

The viscometer sag shoe test (VSST) value was determined for IEDF fluids with and without the OP using Eq. 2. Aldea et al. [Aldea, C.; Growcock, F. B.; Lee, L. J.; Friedheim, J. E.; van Oort, E. Prevention of Dynamic Sag in Deepwater Invert Emulsion Fluids. In Proceedings of the AADE National Drilling Conference, Houston, Tex., USA, 27-29 Mar. 2001, incorporated herein by reference in its entirety] stated that fluid with a VSST value of 1 or less showed minimal sag tendency.

$$\text{VSST} = 0.833 \times (W_2 - W_1) \qquad (2)$$

where, VSST represents the viscometer sag shoe test in ppg, $W_1$ and $W_2$ represent the weight of the syringe filled with 10 mL drilling fluid before and after the dynamic sag test, respectively.

Example 4

Rheology Measurements

After drilling fluids were prepared, their density was measured using mud balance at ambient conditions. Rheology measurements were conducted at high temperatures (350° F.) to study the impact of the new additive (OP) on the rheological properties of the IEDF. The rheological properties including plastic viscosity, yield point, and gel strength at 10-second, 10-minute, and 30-minute were calculated and recorded.

Example 5

HPHT Filtration Experiments

Filtration experiments were performed to evaluate the effect of the anti-sagging additive (OP) on the filtration performance of the drilling fluid. The filtration experiments were performed using a 50-micron ceramic filter disc at 350° F. and 300 psi. Drilling fluid sample (350 cm$^3$) was agitated for 10 minutes before being poured into the filtration cell. Then, the cell was heated to 350° F. under a pressure of 300 psi. The volume of fluid filtrate was measured at different time points. The experiment was stopped after 30 minutes of measurement. The weight and thickness of the formed filter cake were recorded. The filtration experiment was repeated using IEDF sample with the OP additive under the same conditions.

Example 6

Results and Discussions: Sag Tests

Figure 2:
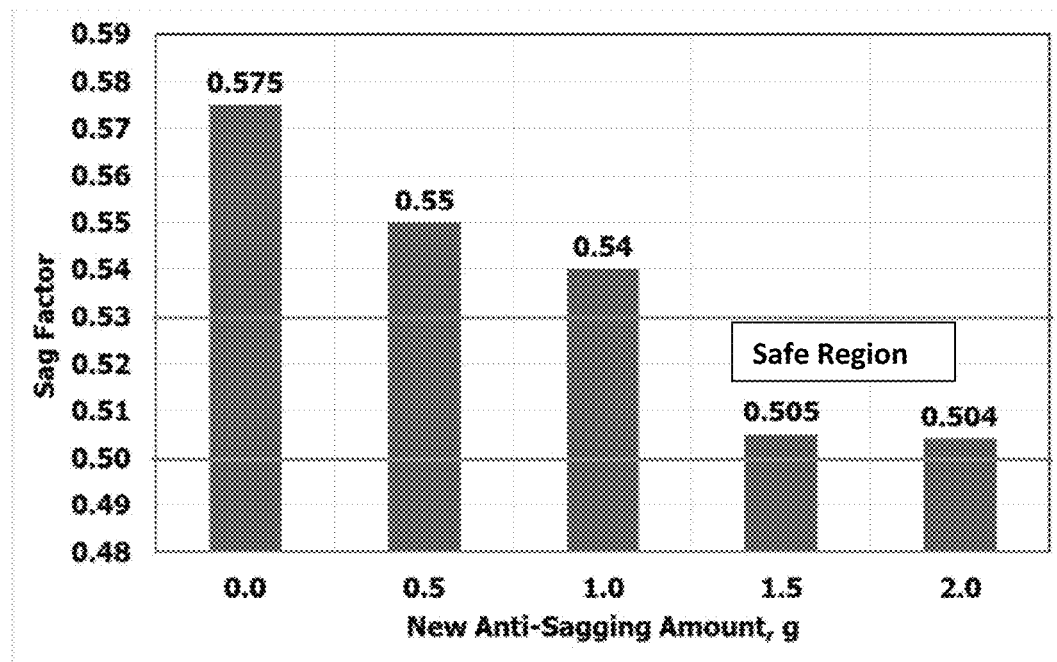
FIG. 2 is a bar graph showing the effect of organophilic phyllosilicate concentration on drilling fluid sag performance at a vertical condition at 350° F.

Vertical static sag tests were conducted at 350° F. after heating the IEDF having different amounts of OP additive for 24 hours in the aging cell. FIG. 2 shows that the sag factor was 0.577 for the IEDF with zero amount of OP, indicating settling of the weighting material because the density at the bottom of the aging cell was higher than the density at the top of the cell. After adding 0.5 g of the OP, the sag factor reduced to 0.55. However, 0.5 g of the OP was not enough to prevent solid settling. The sag factor was still out of the safety region when the OP amount was increased to 1.0 g, confirming that 1.0 g of OP is not enough to prevent the sag issue at 350° F. The sag factor was reduced to 0.505 when the OP amount was increased to 1.5 g, which indicated this amount of OP was enough to prevent the solid settling at 350° F. A very similar sag factor result (0.504) was obtained using 2.0 g of OP additive. Based on the above results, 1.5 g of OP was determined to be an optimum amount that could be used to effectively prevent the barite sagging at 350° F.

Figure 3:
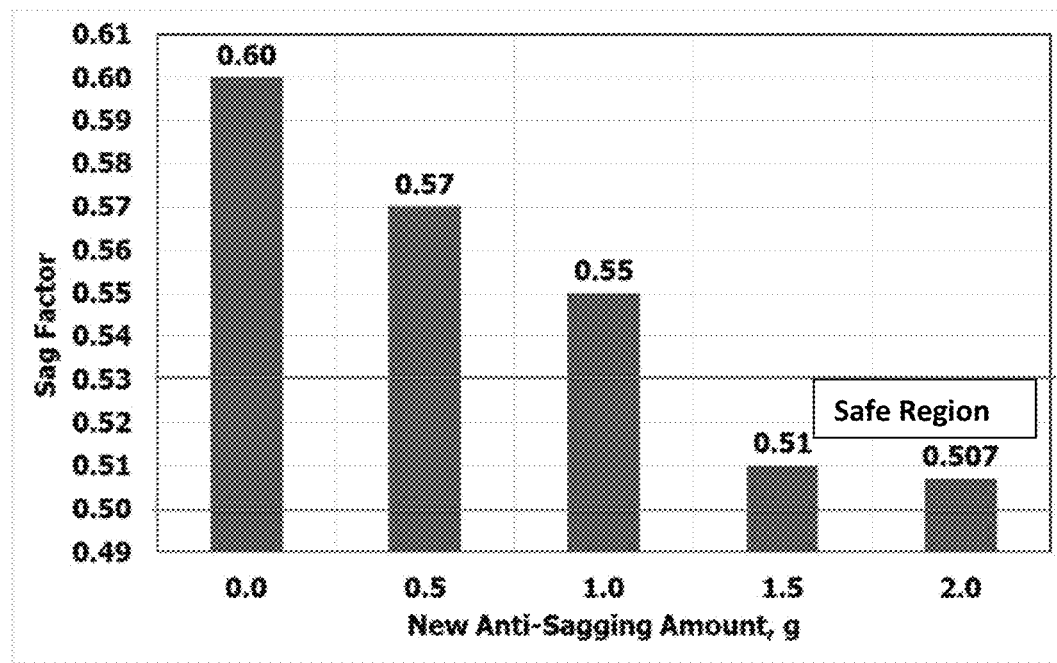
FIG. 3 is a bar graph showing the effect of organophilic phyllosilicate concentration on drilling fluid sag performance at inclined condition (45 degree angle) at 350° F.

Inclined sag test (45 degree) was conducted at 350° F. after heating the drilling fluid with different amounts of OP for 24 hrs in the aging cell under static conditions. FIG. 3 shows that the base IEDF had a sag factor of 0.60, which was too high and out of safety region. Adding 0.5 g of OP decreased the sag factor to 0.57. Increasing the amount of OP to 1.0 g yielded an even lower sag factor of 0.55, which was still out of the safety region. These results confirmed that OP at the amount of 1.0 g was not enough to prevent the barite sagging under the above mentioned conditions.

Adding 1.5 g of OP into IEDF lowered the sag factor to 0.51, confirming the prevention of the sag issue. A similar result was obtained by increasing the amount of OP to 2 g where the sag factor was 0.507. These result indicated that 1.5 g of OP was effective to prevent the inclined sag issue under static condition.

Figure 4:
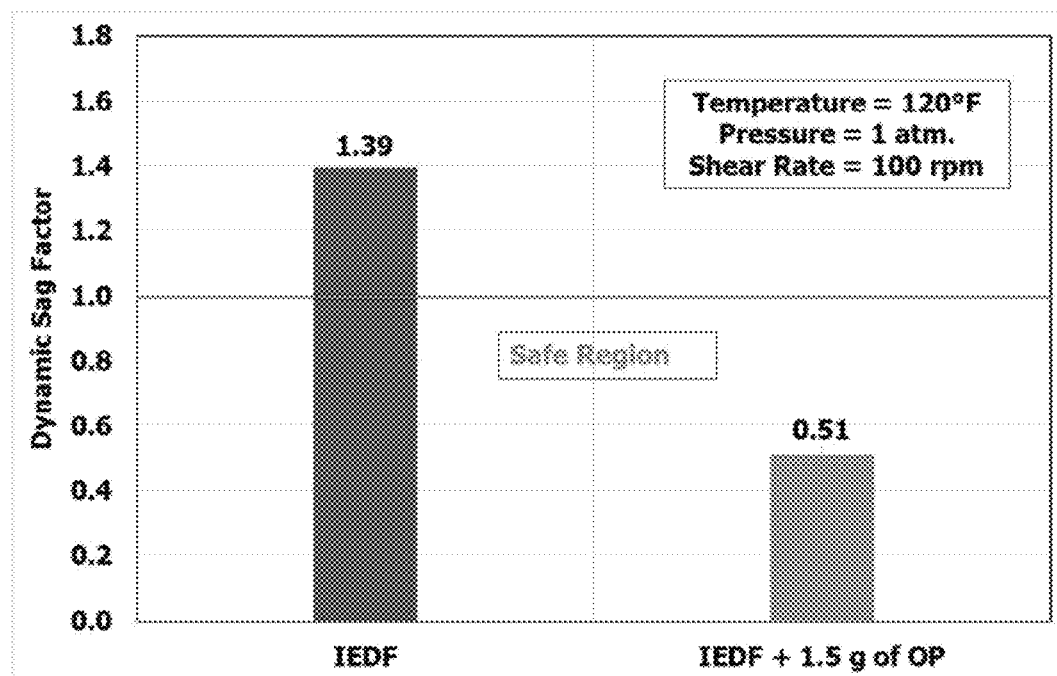
FIG. 4 is a bar graph showing the dynamic sag performance of drilling fluids in the absence (base) or presence of organophilic phyllosilicate.

Dynamic sag test was conducted for the IEDF without OP (base IEDF) and with 1.5 g of OP to evaluate the fluid sag tendency under dynamic conditions. As shown in FIG. 4, the VSST value for the base IEDF under 100 rpm and 120° F. was 1.39, which was out of the safety region. Adding the OP (1.5 g) has enhanced the fluid stability and particle distribution in the fluid. The VSST value was 0.51 for the IEDF with 1.5 OP (FIG. 4). These results indicated that adding the organophilic phyllosilicate to the IEDF effectively prevented the barite sagging under both dynamic and static conditions.

Example 7

Results and Discussions: Rheological Properties

Figure 5:
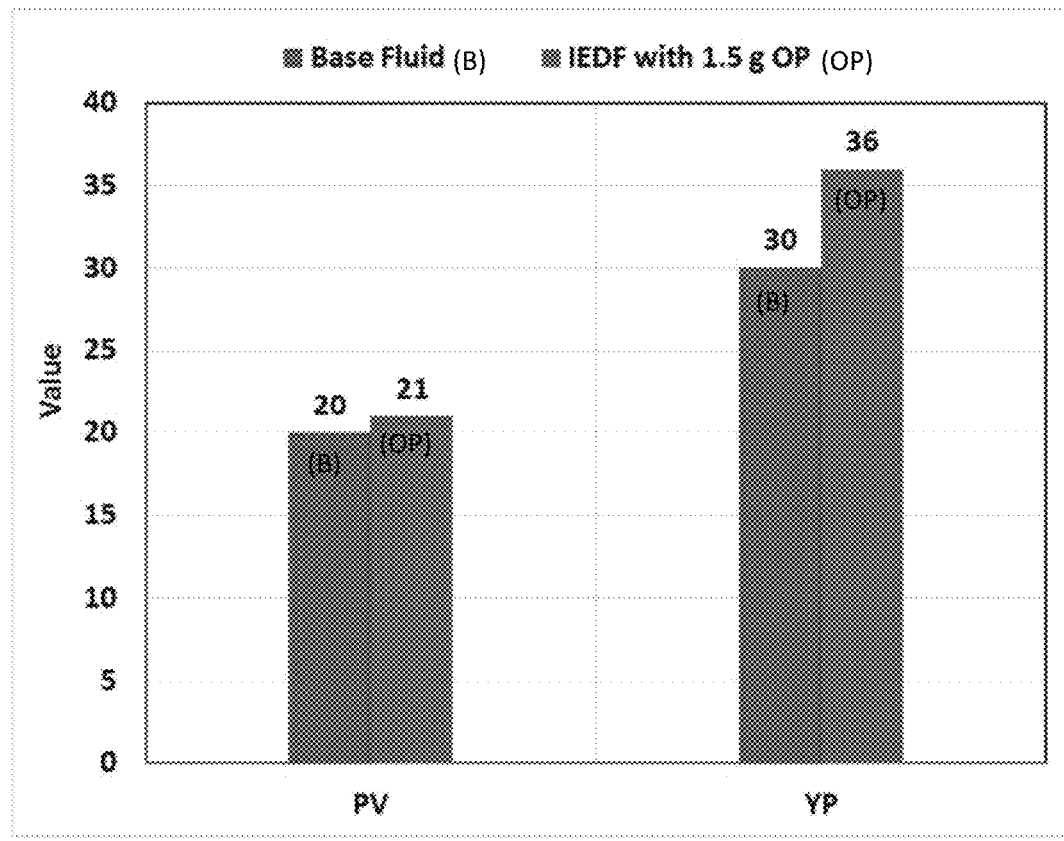
FIG. 5 is a bar graph showing the rheological properties of drilling fluids in the absence (base) or presence of organophilic phyllosilicate at 350° F.

The rheological test was conducted by measuring the shear stress at different shear rates for the base IEDF and the IEDF with recommended concentration of OP (i.e. 1.5 g) based on the sag test. The rheological experiment was conducted at 350° F. FIG. 5 shows that the plastic viscosity of the base IEDF fluid was 20 cP, which was slightly increased to 21 cP after addition of 1.5 g of the OP. The yield point was 30 lb/100 ft$^2$ for the base IEDF which was increased to 36 lb/100 ft$^2$ after addition of 1.5 g of the OP. The increase in the YP value is important for drilling operation applications because the drilling fluid carrying capacity during circulation would increase with increasing YP value.

Yield point to plastic viscosity ratio (YP/PV) could be used to evaluate the stability of drilling fluids. According to Chilingarian et al. [Chilingarian, G., Alp, E., Uslu, S., Gonzales, S., Ronald, J., 1983. Drilling Fluid Evaluation Using Yield Point-Plastic Viscosity Correlation. Paper SPE 12469. July 27, incorporated herein by reference in its entirety], a higher YP/PV ratio indicated a more stabilized drilling fluid. A large YP/PV ratio resulted in great shear thinning behavior of the drilling fluid, which would help preventing the cutting accumulation when drilling high angle holes [Hussaini, S. M., Azar, J. J., 1983. Experimental study of drilled cuttings transport using common drilling muds. Soc. Petrol. Eng. J. 11-20; and Caenn, R., Darley, H. C. H., Gray, G. R., 2011. Composition and Properties of Drilling and Completion Fluids, six. ed. Elsevier, each incorporated herein by reference in their entirety]. The YP/PV ratio was 1.5 for the base IEDF, and it increased to 1.71 after adding 1.5 g of OP to the IEDF.

Figure 6:
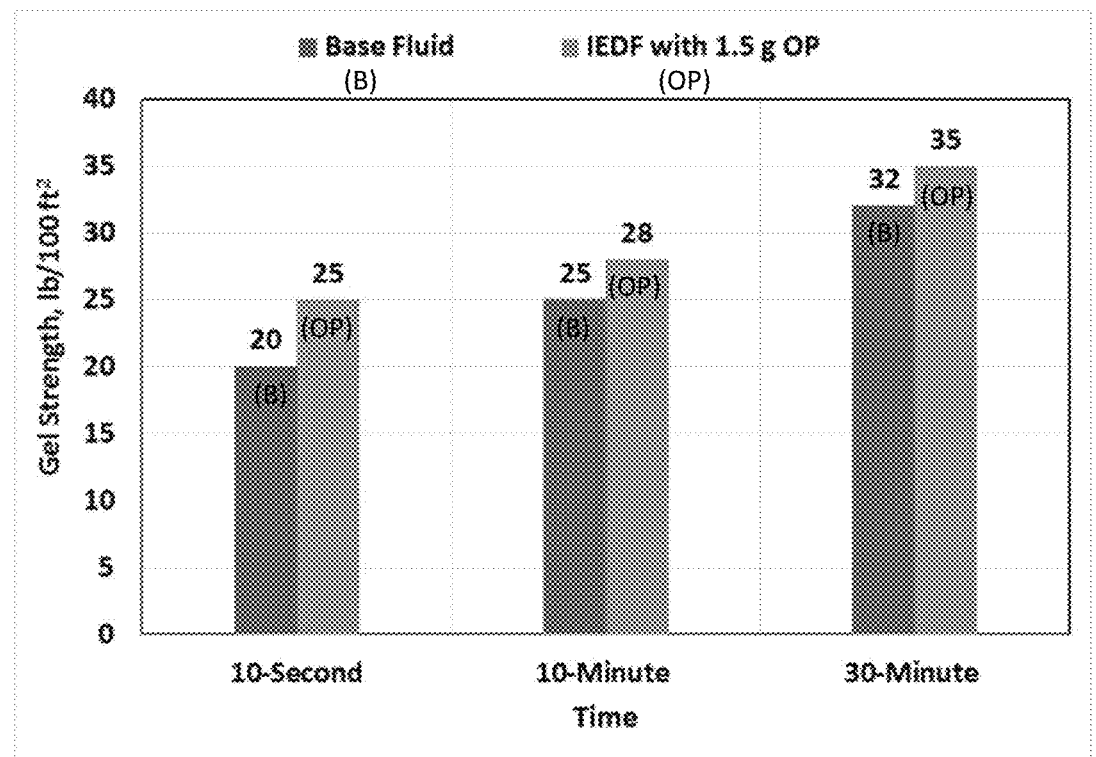
FIG. 6 is a bar graph showing ten-second, ten-minute, and thirty-minute gel strengths of drilling fluids in the absence (base) or presence of organophilic phyllosilicate at 350° F.

The gel strength was measured at a low shear rate of 3 rpm at 350° F. at different time points (e.g. 10 seconds, 10 minutes, and 30 minutes). FIG. 6 shows that adding 1.5 g of OP to the IEDF has enhanced the gel strength at different time periods. The 10 second gel strength was 20 lb/100 ft$^2$ for the base IEDF, which was increased to 25 lb/100 ft$^2$ after addition of 1.5 g of OP to the base IEDF. A similar behavior was observed for the 10-minute gel strength where the value was increased from 25 to 28 lb/100 ft$^2$ after adding 1.5 g of OP to the base IEDF. The 30-minute gel strength was increased from 32 to 35 lb/100 ft$^2$ after adding 1.5 g of OP, as shown in FIG. 6. These results indicated better dispersion of the solid particles during the very low shear rate (3 rpm) after adding the OP. Furthermore, these data, together with the sag test results, showed that adding 1.5 of OP to the IEDF prevented the solid sagging and enhanced the ability of the fluid to suspend the particles.

Example 8

Results and Discussion: Storage Modulus

Figure 7:
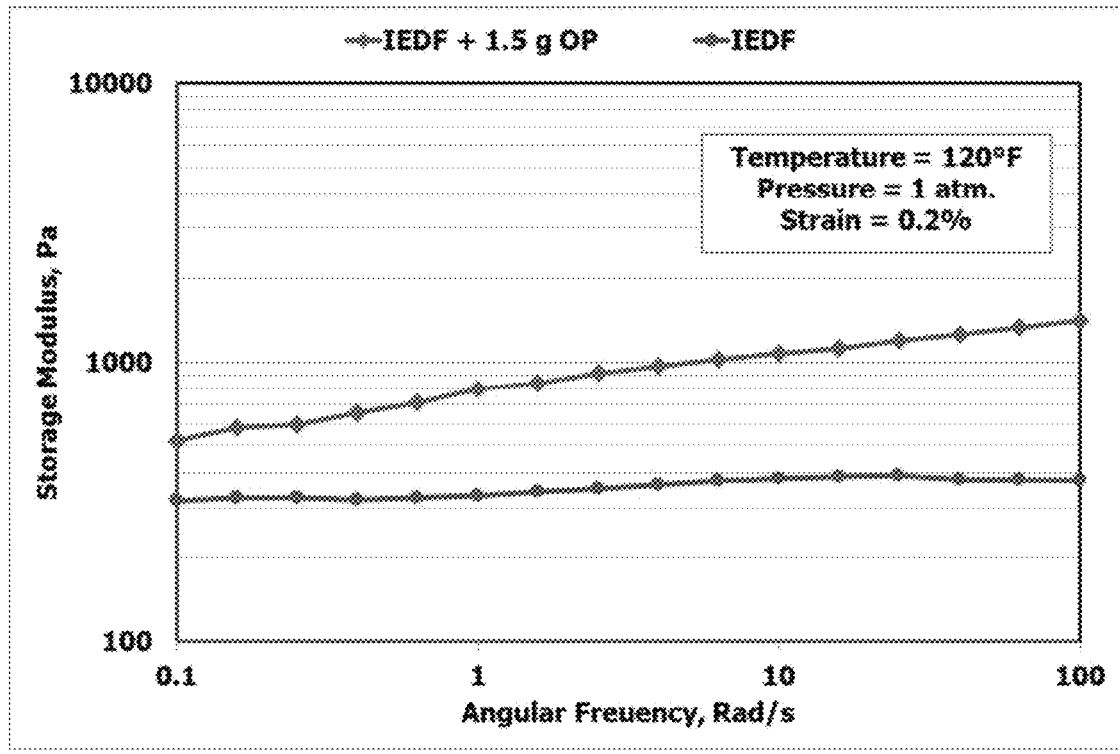
FIG. 7 shows the storage modulus of drilling fluids in the absence (base) or presence of organophilic phyllosilicate.

The frequency sweep test was used to measure the response of a fluid to deformation in a time-dependent manner. As shown in FIG. 7, the storage modulus (G') of the IEDF with the OP was higher than the storage modulus of the base IEDF at 120° F. under 0.2% strain. An average value of G' was 950 Pa after adding the OP, while the average G' of the base IEDF was 350 Pa. Increasing the storage modulus would improve the gel strength and suspension capacity of the fluid. These results were in agreement with the sag test results and further demonstrated the enhancement of the suspension capability of the IEDF after addition of the OP.

Example 9

Results and Discussion: Filtration Tests

Figure 8:
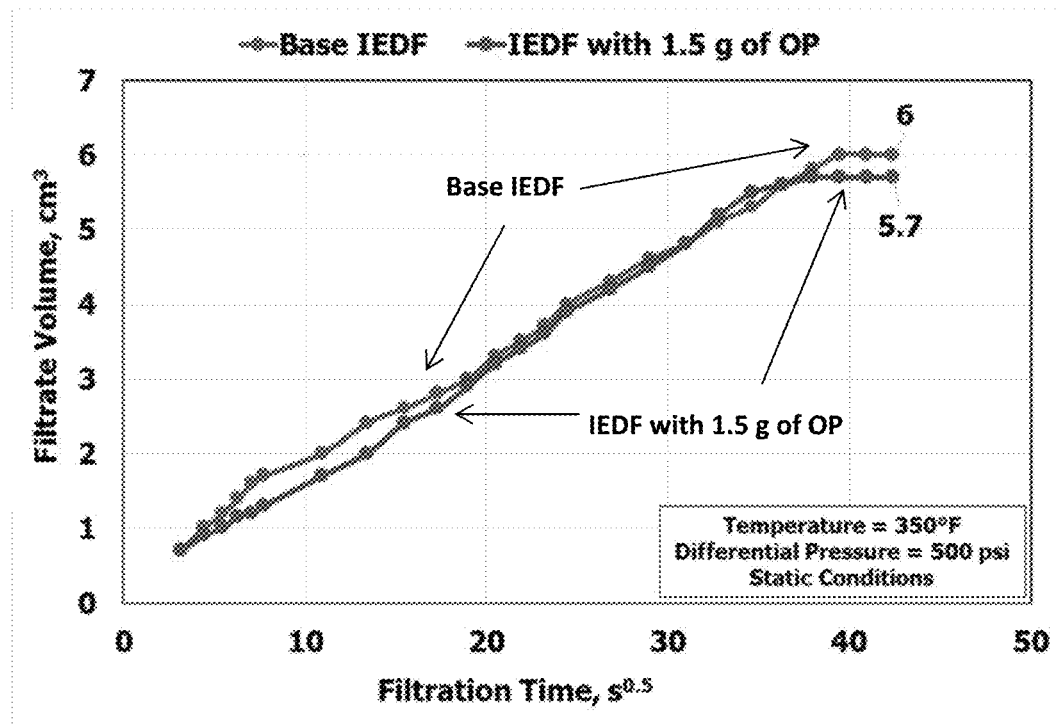
FIG. 8 shows the filtrate volume of drilling fluids in the absence (base) or presence of organophilic phyllosilicate at 350° F.

The filtration test was conducted using a high-pressure high temperature filter press at 350° F. for the base fluid (IEDF) and the IEDF with 1.5 g of the OP under static conditions. The pressure difference across the filter media was 500 psi. FIG. 8 illustrates that two drilling fluid formulations yielded similar behaviors of filtration. The cumulative filtrate volume was 6.0 cm$^3$ for the base IEDF after 30 minutes of filtration, while the cumulative filtrate volume was 5.7 cm$^3$ for IEDF with 1.5 g of the OP.

Figure 9:
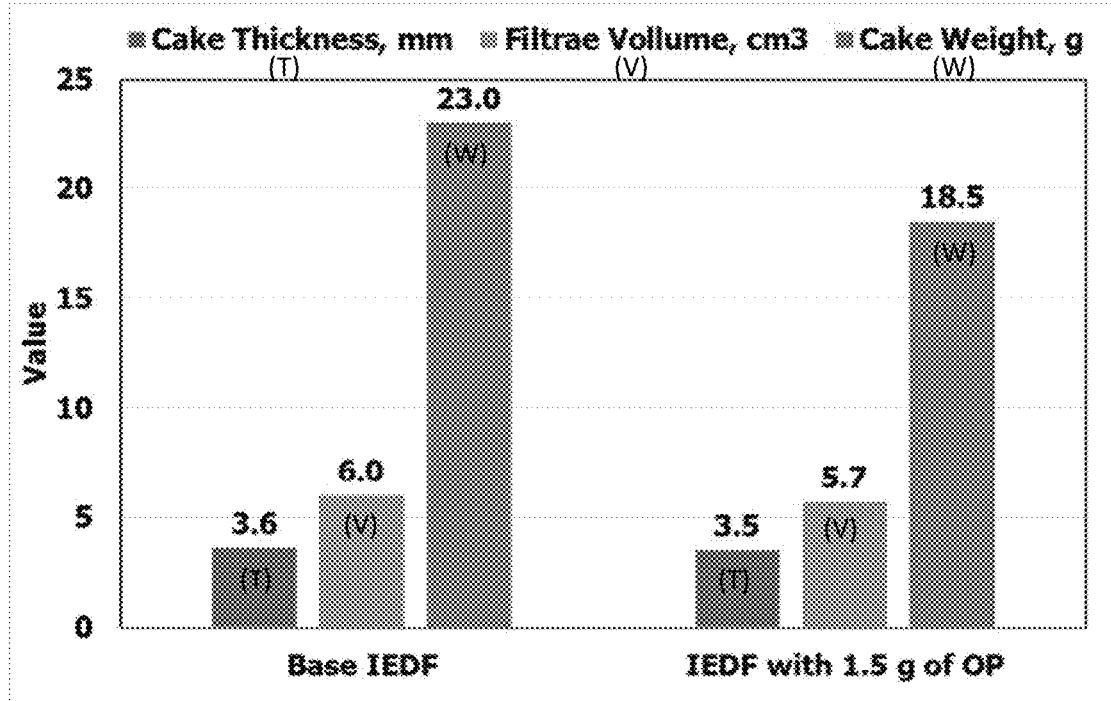
FIG. 9 is a bar graph summarizing filtration properties of drilling fluids in the absence (base) or presence of organophilic phyllosilicate at 350° F.

The filter cake thickness for the base fluid was 3.6 mm while the thickness for the IEDF with 1.5 g of OP was 3.5 mm. As shown in FIG. 9, the filter cake weight for the base fluid was 23 g, which was reduced to 18.5 g after adding 1.5 g of the OP. The reduction of the filter cake weight resulted from the good dispersion of solid particles during the filtration process which eliminated settling of barite particles and prevented these particles from becoming a part of the filter cake. These results showed that there was a slight enhancement in the filtration properties after adding 1.5 g of the OP to the IEDF.

Example 10

All Oil Type Drilling Fluid: Base Composition

Another drilling fluid formulation was obtained from Oil and Gas Field which contained 0.75% bbl oil and other additives including barite (317 g) as weighting material, and calcium carbonate with fine and medium sizes as bridging material. This drilling fluid is an all oil type drilling fluid. Table 3 lists the components present in the drilling fluid.

TABLE 3

All oil type drilling fluid base composition

| Material | Unit | Quantity |
|---|---|---|
| Diesel | bbl | 0.75 |
| Lime | g | 7 |
| EZ-Mul | g | 6 |
| Duratone II | g | 8 |
| Geltone | g | 12 |
| CaCO$_3$-25 | g | 10 |
| CaCO$_3$-50 | g | 20 |
| Barite | g | 317 |

Example 11

All Oil Type Drilling Fluid: Sag Tests

Figure 10:
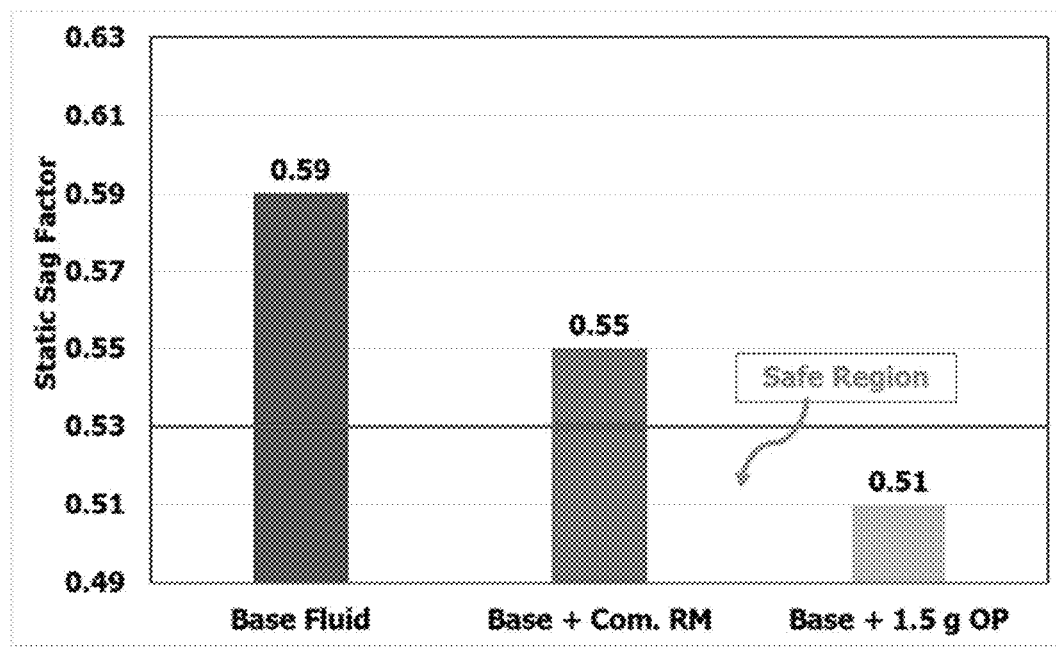
FIG. 10 shows vertical sag performance of all-oil drilling fluids (Table 3) in the absence (base) or presence of organophilic phyllosilicate, or in the presence of a commercial rheology modifier (Com. RM).

Static sag tests were conducted for the all oil type base fluid at 350° F. under static conditions. FIG. 10 shows that the sag factor for the base fluid was 0.59, indicating barite settling. 1 g of commercial rheology modifier (RM-63®, available from Halliburton) was added to the all oil type base fluid, and the sag test was performed on the resulting drilling fluid "Base+Com.RM". FIG. 10 shows that the sag factor was 0.55, indicating the sag issue still existed. To solve the sag issue, 1.5 g of organophilic phyllosilicates (OP) was added to the all oil type base fluid, and the sag test was performed on the resulting drilling fluid "Base+1.5 g OP". FIG. 10 shows that the sag factor went down to 0.51, confirming the increased stability of the "Base+1.5 g OP" fluid and enhanced suspension of barite particles in the fluid.

Figure 11:
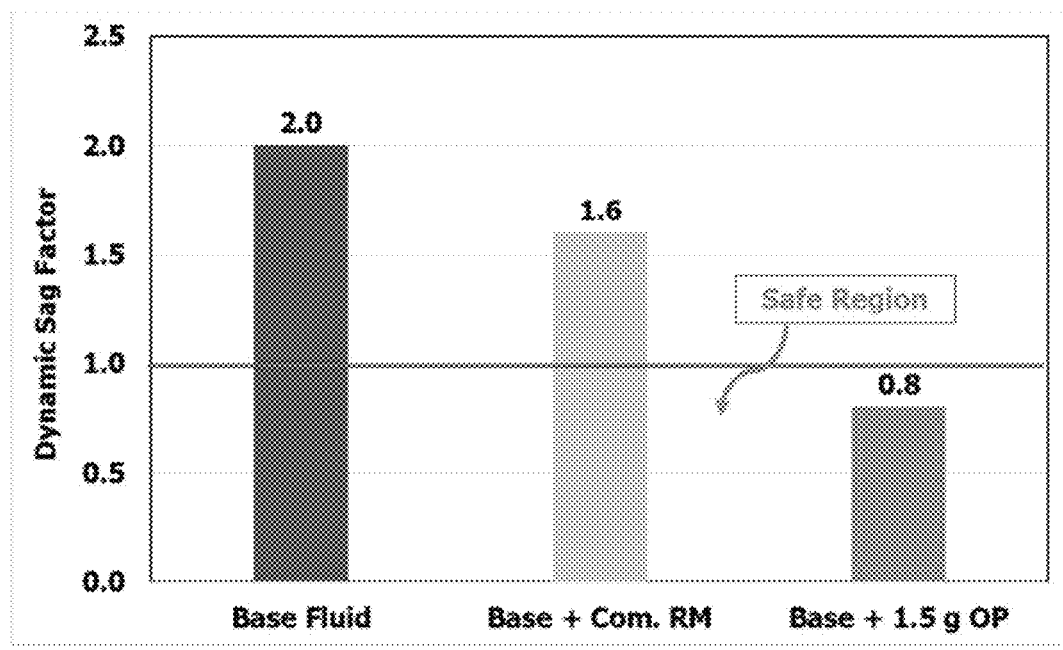
FIG. 11 shows dynamic sag performance of all-oil drilling fluids (Table 3) in the absence (base) or presence of organophilic phyllosilicate, or in the presence of a commercial rheology modifier (Com. RM).

Dynamic sag tests were also conducted on the three fluids under 100 rpm and a temperature of 120° F. FIG. 11 shows that the all oil type base fluid had a dynamic sag factor of 2.0, which was out of the safe region and indicating barite sagging. A similar result was obtained for the drilling fluid "Base+Com.RM" with a dynamic sag factor of 1.6, confirming the barite sagging under dynamic conditions. Importantly, the drilling fluid "Base+1.5 g OP" had a dynamic sag factor of 0.80, which indicated the stability of the fluid and enhanced suspension of the barite particles.

Example 12

Extensive work was conducted to evaluate the use of the organophilic phyllosilicates to prevent barite sagging for invert emulsion drilling fluid at high pressure and high temperature conditions. Based on the obtained results, a few noted features of the present disclosure include: 1) at an optimum concentration of the organophilic phyllosilicates at 1.5 g, static barite sag issue could be prevented at 350° F. under vertical and inclined conditions; 2) the drilling fluid with organophilic phyllosilicates (1.5 g) showed no sag tendency under dynamic condition where the VSST value was determined to be 0.51; 3) addition of 1.5 g of the organophilic phyllosilicates has enhanced the rheological properties (e.g. increased yield point to plastic viscosity ratio); 4) the organophilic phyllosilicates have enhanced the suspension capability of the drilling fluid at low shear rate (3 rpm); and 5) a minor enhancement of the filtration properties of the drilling fluid was also observed after addition of 1.5 g of organophilic phyllosilicates to the drilling fluid.

The invention claimed is:

1. A drilling fluid, comprising:
   an oil phase;
   an organophilic phyllosilicate; and
   a weighting agent,
   wherein the organophilic phyllosilicate comprises an ion-exchange reaction product of a smectite-type clay and a compound of formula (I)

(I)

or a salt thereof, a solvate thereof, a tautomer thereof, a stereoisomer thereof, or a mixture thereof;
wherein:
$R_1$ is unbranched and selected from the group consisting of a hydrogen, an optionally substituted $C_{1-6}$ alkyl, an optionally substituted alkenyl, and an optionally substituted aryl;
$R_2$ and $R_3$ are unbranched and independently a hydrogen, or an optional substituted $C_{1-6}$ alkyl; and
X is an anion selected from the group consisting of a hexafluorophosphate ion, a trifluoromethanesulfonate ion, a tetrafluoroborate ion, and a halide ion, wherein the drilling fluid has a sag factor in a range of 0.500-0.510 at a vertical condition, at a temperature of 180-500° F. and a pressure of 300-800 psi, wherein the drilling fluid has a sag factor in a range of 0.500-0.510 at an inclined condition of 30-60°, at a temperature of 180-500° F. and a pressure of 300-800 psi, and wherein the drilling fluid has a yield point of 35-40 lb/100 ft² at a temperature of 180-500° F.

2. The drilling fluid of claim 1, further comprising an aqueous phase dispersed in the oil phase.

3. The drilling fluid of claim 1, wherein $R_1$ is a $C_{2-4}$ alkenyl substituted with one or more halogens.

4. The drilling fluid of claim 1, wherein $R_1$ is ClCH=CH—*.

5. The drilling fluid of claim 1, wherein $R_2$ and $R_3$ are a hydrogen.

6. The drilling fluid of claim 1, wherein the anion is a chloride.

7. The drilling fluid of claim 1, wherein the compound of formula (I) is

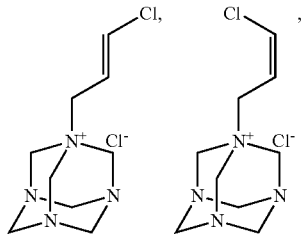 [SMILES: Cl/C=C/C[N+]12CN3CN(CN(C3)C1)C2 ; [Cl-] ; Cl/C=C\C[N+]12CN3CN(CN(C3)C1)C2 ; [Cl-]]

or both.

8. The drilling fluid of claim 1, wherein at least 50 mol % of exchangeable cations of the smectite-type clay are ion exchanged with quaternary ammonium cations from the compound of formula (I).

9. The drilling fluid of claim 1, wherein the smectite-type clay comprises bentonite.

10. The drilling fluid of claim 1, wherein the organophilic phyllosilicate has a bulk density of 75-250 kg/m³, and a specific weight of 1.1-2.5 g/cm³.

11. The drilling fluid of claim 1, wherein the weighting agent is barite.

12. The drilling fluid of claim 1, wherein the organophilic phyllosilicate is present in an amount of 500-40,000 mg/L relative to a total volume of the drilling fluid, and a weight ratio of the weighting agent to the organophilic phyllosilicate ranges from 50:1 to 300:1.

13. The drilling fluid of claim 1, further comprising at least one additive selected from the group consisting of an emulsifier, a viscosifier, a fluid-loss control agent, and a bridging agent.

14. The drilling fluid of claim 1, which has a density in a range of 14-20 ppg.

15. The drilling fluid of claim 1, which has a ten-second gel strength of 24-30 lb/100 ft², a ten-minute gel strength of 27-35 lb/100 ft², and a thirty-minute gel strength of 34-40 lb/100 ft², at a temperature of 180-500° F.

16. The drilling fluid of claim 1, which has a plastic viscosity of 20.5-25 cP at a temperature of 180-500° F.

17. A method of drilling a subterranean geological formation, the method comprising:
    drilling the subterranean geological formation to form a wellbore therein; and
    circulating the drilling fluid of claim 1 into the wellbore during the drilling,
    wherein the organophilic phyllosilicate prevents sagging of the weighting agent in the wellbore.

18. The drilling fluid of claim 1, wherein the drilling fluid comprises the organophilic phyllosilicate in an amount of 1.5 g/bbl to 2.0 g/bbl.

* * * * *